(12) United States Patent
Scheel et al.

(10) Patent No.: US 10,767,003 B2
(45) Date of Patent: Sep. 8, 2020

(54) PROCESS FOR PRODUCING FUNCTIONALIZED POLYTHIOPHENES

(71) Applicant: Heraeus Deutschland GmbH & Co. KG, Hanau (DE)

(72) Inventors: Arnulf Scheel, Cologne (DE); Katrin Asteman, Cologne (DE); Matthias Intelmann, Cologne (DE); Udo Merker, Köln (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 239 days.

(21) Appl. No.: 15/535,920

(22) PCT Filed: Nov. 20, 2015

(86) PCT No.: PCT/EP2015/077219
§ 371 (c)(1),
(2) Date: Jun. 14, 2017

(87) PCT Pub. No.: WO2016/102129
PCT Pub. Date: Jun. 30, 2016

(65) Prior Publication Data
US 2018/0208713 A1    Jul. 26, 2018

(30) Foreign Application Priority Data
Dec. 23, 2014 (EP) .................... 14200233

(51) Int. Cl.
*C08G 61/12* (2006.01)
*H01G 9/00* (2006.01)
(Continued)

(52) U.S. Cl.
CPC .............. *C08G 61/126* (2013.01); *C25B 3/02* (2013.01); *H01B 1/127* (2013.01);
(Continued)

(58) Field of Classification Search
CPC ........................................ C08G 61/12
(Continued)

(56) References Cited

U.S. PATENT DOCUMENTS 5,300,575 A  4/1994 Jonas et al.
5,370,981 A  12/1994 Krafft et al.
(Continued)

FOREIGN PATENT DOCUMENTS

DE  102012018976 A1  3/2014
EP      1122274 A1  8/2001
(Continued)

OTHER PUBLICATIONS

Cutler, et al., Alkoxysulfonate-Functionalized PEDOT Polyelectrolyte Multilayer Films: Electrochromic and Hole Transport Materials, Macromolecules, 2005, 38:3068-3074.
(Continued)

*Primary Examiner* — Duc Truong
(74) *Attorney, Agent, or Firm* — Blank Rome LLP

(57) ABSTRACT

The present invention relates to a process for producing a liquid composition comprising a functionalized π-conjugated polythiophenes, comprising the process steps of i) providing a liquid phase comprising a) thiophene monomers of the general formula (I) wherein X,Y are identical or different and are O, S, or $NR^1$, wherein $R^1$ is hydrogen or an aliphatic or aromatic residue having 1 to 18 carbon atoms; A is organic residue carrying an anionic functional group; b) an oxidizing agent; and c) a solvent; ii) oxidatively polymerizing the thiophene monomers of the general formula (I) to obtain a liquid composition comprising functionalized π-conjugated polythiophenes; wherein (α1) the pH of the liquid phase provided in process step i) is adjusted to a value below 7.0, wherein the pH is determined at a temperature of 20° C.; and (α2) the chloride content of the liquid phase
(Continued)

provided in process step i) is less than 10000 ppm, based on the total weight of the liquid phase. The present invention also relates to the liquid composition obtainable by this process, to a liquid composition comprising a functionalized π-conjugated polythiophene, wherein the com-position is characterized by a certain ratio of mass average molecular weight $M_w$ and the molar average molecular weight $M_n$ of the functionalized π-conjugated polythiophene, to a liquid composition comprising a functionalized π-conjugated polythiophene, wherein the functionalized π-conjugated polythiophene comprises different repeating units in a defined amount, to a process for the preparation of such a liquid composition, to a process for the preparation of a capacitor in which these liquid compositions are used for the formation of the solid electrolyte, to a capacitor obtainable by this process and to the use of the liquid compositions for the preparation of a conductive layer.

38 Claims, 1 Drawing Sheet

(51) Int. Cl.
| | |
|---|---|
| *H01G 9/15* | (2006.01) |
| *H01B 1/12* | (2006.01) |
| *H01G 9/028* | (2006.01) |
| *C25B 3/02* | (2006.01) |
| *H01G 9/025* | (2006.01) |

(52) U.S. Cl.
CPC ........... *H01G 9/0036* (2013.01); *H01G 9/025* (2013.01); *H01G 9/028* (2013.01); *H01G 9/15* (2013.01); *C08G 2261/1424* (2013.01); *C08G 2261/18* (2013.01); *C08G 2261/3223* (2013.01); *C08G 2261/512* (2013.01); *C08G 2261/514* (2013.01); *C08G 2261/794* (2013.01); *C08G 2261/90* (2013.01); *Y02E 60/13* (2013.01)

(58) Field of Classification Search
USPC ................................................ 528/377, 373
See application file for complete search history.

(56) References Cited

U.S. PATENT DOCUMENTS

| | | | |
|---|---|---|---|
| 5,403,467 A | 4/1995 | Jonas et al. | |
| 5,766,515 A | 6/1998 | Jonas et al. | |
| 6,635,729 B1 * | 10/2003 | Groenendaal | C08G 61/126 |
| | | | 526/256 |
| 6,977,390 B2 * | 12/2005 | Andriessen | C08G 61/126 |
| | | | 257/40 |
| 2003/0149171 A1 | 8/2003 | Groenendaal et al. | |
| 2005/0009986 A1 | 1/2005 | Groenendaal et al. | |
| 2006/0236531 A1 | 10/2006 | Merker et al. | |
| 2011/0128675 A1 | 6/2011 | Merker et al. | |

FOREIGN PATENT DOCUMENTS

| | | |
|---|---|---|
| EP | 1323763 A1 | 7/2003 |
| EP | 1323764 A1 | 7/2003 |
| EP | 1746613 A1 | 1/2007 |
| JP | 2013116939 A | 6/2013 |
| JP | 2014028760 A | 2/2014 |
| JP | 2014065898 A | 4/2014 |
| JP | 2014074007 A | 4/2014 |
| JP | 2015168793 A | 9/2015 |
| WO | WO-03048227 A1 | 6/2003 |
| WO | WO-2004018560 A1 | 3/2004 |
| WO | WO-2004019346 A1 | 3/2004 |
| WO | WO-2007031207 A1 | 3/2007 |
| WO | WO-2010003874 A2 | 1/2010 |
| WO | WO-2010089111 A1 | 8/2010 |
| WO | WO-2012041506 A2 | 4/2012 |
| WO | WO-2014048561 A2 | 4/2014 |

OTHER PUBLICATIONS

Cutler, et al., PEDOT Polyelectrolyte Base Electrochromic Films via Electrostatic Adsorption**, Adv. Mater., 2002, 14:9:684-688.
Groenendaal, et al., Poly (3,4-ethylenedioxythiophenre) and Its Derivatives: Past, Present, and Future**, Adv. Mater., 2000, 12:7:481-494.
International Search Report issued in PCT/EP2015/077219 dated Dec. 22, 2015.
Karlsson, et al., Iron-Catalyzed Polymerization of Alkoxysulfonate-Functionalized 3,4-Ethylenedioxythiohere Gives Water-Soluble Poly (3,4-ethylenedioxythiophene) of High Conductivity, Chem. Mater., 2009, 21:1815-1821.
Stephan, et al., Electrochemical Behavious of 3,4-ethylenedioxythiophene Functionalized by a Sulphonate Group, Application to the Preparation of Poly(3,4-ethylenedioxythiophene) Having Permanent Cation-exchange Properties, Journal of Electroanalytical Chemistry, 1998, 443:217-226.
Tran-Van, et al., Sulfonated Polythiophene and Poly (3,4-ethylenedioxthiophere) Derivatives with Cations Exchange Properties, Synthetic Metals, 2004, 142:251-258.
Zotti, et al., Electrochemical and Chemical Synthesis and Characterization of Sulfonated Poly(3,4-ethlenedioxythiophene): A Novel Water-Soluble and Highly Conductive Conjugated Oligomer; Macromol. Chem. Phys., 2002, 203:13, 1958-1964.

* cited by examiner

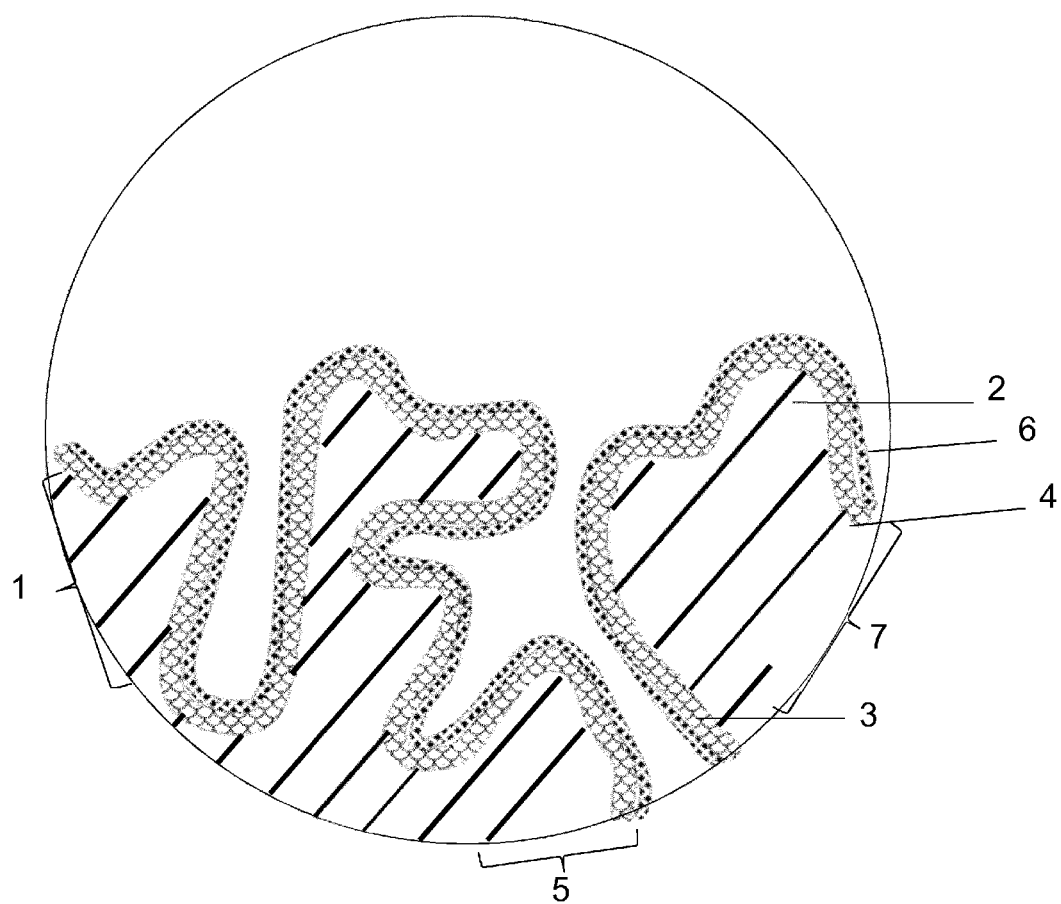

US 10,767,003 B2

PROCESS FOR PRODUCING FUNCTIONALIZED POLYTHIOPHENES

This application is a national stage of International Patent Application No. PCT/EP2015/077219, filed Nov. 20, 2015, which claims the benefit of European Patent Application 14200233.6, filed Dec. 23, 2014, each of which is hereby incorporated by reference in its entirety.

The present invention relates to a process for producing a liquid composition comprising functionalized π-conjugated polythiophenes, to a liquid composition obtainable by this process, to a liquid composition comprising a functionalized π-conjugated polythiophene, wherein the composition is characterized by a certain ratio of mass average molecular weight $M_w$ and the molar average molecular weight $M_n$ of the functionalized π-conjugated polythiophene, to a liquid composition comprising a functionalized π-conjugated polythiophene, wherein the functionalized π-conjugated polythiophene comprises different repeating units in a defined amount, to a process for the preparation of such a liquid composition, to a process for the preparation of a capacitor in which these liquid compositions are used for the formation of the solid electrolyte, to a capacitor obtainable by this process and to the use of the liquid compositions for the preparation of a conductive layer.

A commercially available electrolyte capacitor as a rule is made of a porous metal electrode, an oxide layer serving as a dielectric on the metal surface, an electrically conductive material, usually a solid, which is introduced into the porous structure, an outer electrode (contacting), such as e.g. a silver layer, and further electrical contacts and an encapsulation. An electrolyte capacitor which is frequently used is the tantalum electrolytic capacitor, the anode electrode of which is made of the valve metal tantalum, on which a uniform, dielectric layer of tantalum pentoxide has been generated by anodic oxidation (also called "formation"). A liquid or solid electrolyte forms the cathode of the capacitor. Aluminium capacitors in which the anode electrode is made of the valve metal aluminium, on which a uniform, electrically insulating aluminium oxide layer is generated as the dielectric by anodic oxidation, are furthermore frequently employed. Here also, a liquid electrolyte or a solid electrolyte forms the cathode of the capacitor. The aluminium capacitors are usually constructed as wound- or stacked-type capacitors. π-conjugated polymers are particularly suitable as solid electrolytes in the capacitors described above because of their high electrical conductivity. π-conjugated polymers are also called conductive polymers or synthetic metals. They are increasingly gaining economic importance, since polymers have advantages over metals with respect to processability, weight and targeted adjustment of properties by chemical modification. Examples of known π-conjugated polymers are polypyrroles, polythiophenes, polyanilines, polyacetylenes, polyphenylenes and poly(p-phenylene-vinylenes), a particularly important polythiophene used industrially being poly(3,4-ethylenedioxythiophene) (PEDOT), since it has a very high conductivity in its oxidized form.

The solid electrolytes based on conductive polymers can be applied to the oxide layer in various ways. EP-A-0 340 512 describes, for example, the production of a solid electrolyte from 3,4-ethylenedioxythiophene and the use thereof in electrolytic capacitors. According to the teaching of this publication, 3,4-ethylenedioxythiophene is polymerized on to the oxide layer in situ. In addition to the in situ polymerization a processes for the production of solid electrolytes in capacitors in which a dispersion comprising the already polymerized thiophene and a polyanion as a counter-ion, for example the PEDOT/PSS-dispersions (PEDOT=Poly(3,4-ethylenedioxythiophene; PSS=polystyrene sulfonic acid) known from the prior art, is applied to the oxide layer and the dispersing agent is then removed by evaporation are also known from the prior art. Such a process for the production of solid electrolyte capacitors is disclosed, for example, in DE-A-10 2005 043 828.

However, PEDOT/PSS-dispersion are characterised by the disadvantage that they comprise a significant amount of PSS as a non-conducting inert material. Furthermore, due to the presence of PSS the size of the PEDOT/PSS-particles in the dispersions is sometimes too large to ensure that the particles also penetrate into the smaller pores of the porous metal electrode. Finally, the maximum solids content of PEDOT/PSS-dispersions is often limited to values of about 3 wt.-%. In order to overcome these disadvantages, liquid compositions comprising derivatives of PEDOT have been prepared which are not characterized by the disadvantages of the known PEDOT/PSS-dispersions. Polythiophenes functionalized with sulfonate groups were developed initially. Due to the sulfonate groups, these polythiophenes are self-doped and do not require counter-ions such as PSS. EP 1 122 274 A1, for example, discloses the preparation of functionalized π-conjugated polymers such as poly(4-(2,3-dihydrothieno[3,4-b][1,4]dioxin-2-ylmethoxy)-1-butanesulfonic acid) (PEDOT-S) by oxidative polymerization of the corresponding monomer 4-(2,3-dihydrothieno[3,4-b][1,4] dioxin-2-ylmethoxy)-1-butanesulfonic acid (EDOT-S). However, the electrical conductivity of conductive layers prepared by the polymer solutions obtained in EP 1 122 274 A1 are usually too low to use these polymer solutions for the preparation of, for example, a solid electrolyte layer in a solid electrolyte capacitor.

It was therefore an object of the present invention to overcome the disadvantages of the prior art in the field of water-soluble π-conjugated polymers.

In particular, it was an object of the present invention to provide compositions comprising a water-soluble or water-dispersible π-conjugated polymer that, compared to the corresponding compositions known from the prior art, are characterized in that the electrical conductivity of a conductive layer that is prepared from these compositions is increased.

It was also an object of the present invention to provide compositions comprising a water-soluble or water-dispersible π-conjugated polymer that, when used for the formation of a solid electrolyte layer in a capacitor, leads to advantageous properties of the capacitor, in particular to an advantageous capacitance and/or an advantageous ESR (equivalent series resistance) compared to a capacitor the solid electrolyte layer of which has been prepared using the corresponding compositions known from the prior art.

Furthermore, it was also an object of the present invention to provide compositions comprising a water-soluble or water-dispersible π-conjugated polymer that, when used for the formation of a solid electrolyte layer in a capacitor, help to improve the stability of the capacitor when being stored at high temperatures and high relative humidity. The stability of the capacitor under such storage conditions is defined in terms of the extent to which the electrical properties of the capacitor, in particular the capacitance and the ESR, deteriorate during storage.

A contribution to the solution of at least one of the above objects is provided by the subject matter of the category-forming independent claims, wherein the therefrom dependent subclaims represent preferred embodiments of the

BRIEF DESCRIPTIONS OF THE DRAWINGS

FIG. 1 is a diagram of a section through a part of a capacitor obtainable by a process according to the present invention.

EMBODIMENTS

I. A process for producing a liquid composition comprising functionalized π-conjugated polythiophenes, the process comprising the steps of
   i) providing a liquid phase comprising
      a) thiophene monomers of the general formula (I)

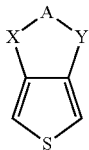

(I)

wherein
      X,Y are identical or different and are O, S, or $NR^1$, wherein $R^1$ is hydrogen or an aliphatic or aromatic residue having 1 to 18 carbon atoms;
      A is an organic residue carrying an anionic functional group;
   b) an oxidizing agent; and
   c) a solvent;
   ii) oxidatively polymerizing the thiophene monomers of the general formula (I) to obtain a liquid composition comprising functionalized π-conjugated polythiophenes;
   wherein
      (α1) the pH of the liquid phase provided in process step i) is adjusted to a value below 7.0, wherein the pH is determined at a temperature of 20° C.; and
      (α2) the chloride content of the liquid phase provided in process step i) is less than 10000 ppm, based on the total weight of the liquid phase.
II. The process according to embodiment I, wherein
      (α3) the oxygen content of the liquid phase provided in process step i) is less than 1000 ppm, based on the total weight of the liquid phase.
III. The process according to embodiments I or II, wherein
      X, Y are O,
      A is $-(CH_2)_m-CR^2R^3-(CH_2)_n-$,
      wherein
         $R^2$ is hydrogen or $-(CH_2)_s-Z-(CH_2)_p-SO_3^-M^+$,
         $R^3$ is $-(CH_2)_s-Z-(CH_2)_p-SO^-M^+$,
         Z is O, S or $-CH_2-$,
         $M^+$ is a cation,
         m and n are identical or different and are an integer from 0 to 3,
         s is an integer from 0 to 10 and
         p is an integer from 1 to 18;
IV. The process according to anyone of the preceding embodiments, wherein in the general formula (I)
      X, Y are O,
      A is $-(CH_2)-CR^2R^3-(CH_2)_n-$,
      wherein
         $R^2$ is hydrogen,
         $R^3$ is $-(CH_2)_s-O-(CH_2)_p-SO_3^-M^+$,
         $M^+$ is $Na^+$ or $K^+$,
         n is 0 or 1,
         s is 0 or 1, and
         p is 4 or 5.
V. The process according to embodiment IV, wherein
      X, Y are O,
      A is $-(CH_2-CHR)-$,
      wherein
         R is $-(CH_2)_t-O-Ar-[(W)_u-SO_3^-M^-]_v$,
         wherein
            Ar represents an optionally substituted $C_6$-$C_{20}$ arylene group;
            W represents an optionally substituted $C_1$-$C_6$ alkylene group;
            $M^+$ represents $H^+$, an alkali cation selected from the group consisting of $Li^+$, $Na^+$, and $K^+$, $NH(R^1)_3$ or $HNC_5H_5$, wherein each $R^1$ group independently represent a hydrogen atom or an optionally substituted $C_1$-$C_6$ alkyl group;
            t represents an integer of 0 to 6;
            u represents an integer of 0 or 1; and
            v represents an integer of 1 to 4.
VI. The process according to anyone of the preceding embodiments, wherein the oxidizing agent b) is a salt of a heavy metal, a salt of a peroxodisulfate or a mixture thereof.
VII. The process according to anyone of embodiments I to V, wherein the thiophen monomers are polymerized by electrochemical polymerization and wherein the oxidizing agent b) is an electrode.
VIII. The process according to anyone of the preceding embodiments, wherein the solvent c) is water.
IX. The process according to anyone of the preceding embodiments, wherein the pH of the fluid phase provided in process step i) is adjusted to a value below 7.0 using an organic or inorganic acid.
X. The process according to anyone of the preceding embodiments, wherein the oxidative polymerization in process step ii) is performed under an inert gas atmosphere of nitrogen, argon, carbon dioxide or a mixture thereof.
XI. The process according to embodiment X, wherein the oxidative polymerization in process step ii) is performed under a pressure that is equal to or above the vapor pressure of the liquid phase during the polymerization reaction in process step ii).
XII. The process according to anyone of the preceding embodiments, wherein the oxidative polymerization in process step ii) is performed under a reduced pressure of not more than 0.8 bar.
XIII. The process according to anyone of the preceding embodiments, wherein in a further process step iii) the liquid composition obtained in process step ii) is purified.
XIV. The process according to embodiment XIII, wherein purification is accomplished by means of filtration and/or by means of a treatment with ion exchanger.
XV. The process according to anyone of the preceding embodiments, wherein the particle size distribution of the functionalized π-conjugated polythiophenes in the liquid composition obtained in process step ii) or in process step iii) is adjusted by a treatment of the liquid composition with ultrasound, by a treatment of the liquid composition with high pressure homogenization or by a treatment of the liquid composition with heat.
XVI. A liquid composition obtainable by the process according to anyone of the preceding embodiments.

XVII. A liquid composition comprising a functionalized π-conjugated polythiophene, wherein the polythiophene comprises repeating units of the general formula (I)

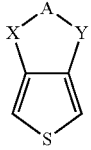

(I)

wherein X,Y and A are as defined in embodiment I, III, IV and V and wherein the ratio of the mass average molecular weight $M_w$ to the molar average molecular weight $M_n$ ($M_w/M_n$) of the functionalized π-conjugated polythiophene is at least 6, preferably at least 8, more preferably at least 10, more preferably at least 12, more preferably at least 14, more preferably at least 16, more preferably at least 18 and more preferably at least 20.

XVIII. The liquid composition according to embodiment XVII, wherein $M_w/M_n$ is at most 100, preferably at most 75 and more preferably at most 50.

XIX. The liquid composition according to embodiment XVII or XVIII, wherein the mass average molecular weight $M_w$ of the functionalized π-conjugated polythiophene is at least 50000 g/mol, preferably at least 75000 g/mol, more preferably at least 100000 g/mol and most preferably at least 125000 g/mol.

XX. The liquid composition according to anyone of embodiments XVII to XIX, wherein the mass average molecular weight $M_w$ of the functionalized π-conjugated polythiophene is in the range from 125000 g/mol to 240000 g/mol and preferably in the range from 125000 g/mol to 210000 g/mol.

XXI. The liquid composition according to anyone of embodiments XVII to XX, wherein the molar average molecular weight $M_n$ of the functionalized π-conjugated polythiophene is less than 25000 g/mol, preferably less than 20000 g/mol and more preferably less than 15000 g/mol.

XXII. The liquid composition according to anyone of embodiments XVII to XXI, wherein in the liquid composition the functionalized π-conjugated polythiophene is present in the form of particles, wherein the particle size distribution is characterized by
  i) a $d_{50}$-value (weight average particle diameter) in the range from 1 to 100 nm, preferably in the range from 1 to 80 nm, more preferably in the range from 1 to 60 nm and most preferable in the range from 5 to 40 nm, and
  ii) a $d_{90}$-value of less than $3.5 \times d_{50}$, preferably less than $3 \times d_{50}$ and more preferably less than $2 \times d_{50}$.

XXIII. The liquid composition according to anyone of embodiments XVII to XXII, wherein the functionalized π-conjugated polythiophene comprises repeating units of the general formula (Ia) and repeating units of the general formula (Ib)

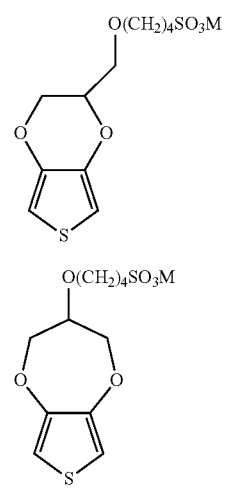

(Ia)

(Ib)

and wherein the content of repeating units of the general formula (Ib) is less than 20 wt.-%, preferably less than 18 wt.-%, more preferably less than 16 wt.-%, more preferably less than 14 wt.-%, more preferably less than 12 wt.-% and most preferably less than 10 wt.-% and the content of repeating units of the general formula (Ia) is more than 80 wt.-%, more preferably more than 82 wt.-%, more preferably more than 84 wt.-%, more preferably more than 86 wt.-%, more preferably more than 88 wt.-% and most preferably at least 90 wt.-%, in each case based on the total weight of the functionalized π-conjugated polythiophene, wherein the content of repeating units of the general formula (Ia) and the content of repeating units of the general formula (Ib) preferably sum up to 100 wt.-%.

XXIV. The liquid composition according to embodiment XXIII, wherein the content of repeating units of the general formula (Ib) is at least 0.2 wt.-%, preferably at least 1 wt.-% and more preferably at least 2 wt.-%, in each case based on the total weight of the functionalized π-conjugated polythiophene.

XXV. A process for producing a liquid composition comprising functionalized π-conjugated polythiophenes, the process comprising the steps of
  i) providing a liquid phase comprising
    a) thiophene monomers of the general formula (I)

(I)

wherein X,Y and A are as defined in embodiment I, III, IV and V,
wherein the liquid phase comprises a mixture of thiophene monomers of the general formula (Ia) and thiophene monomers of the general formula (Ib)

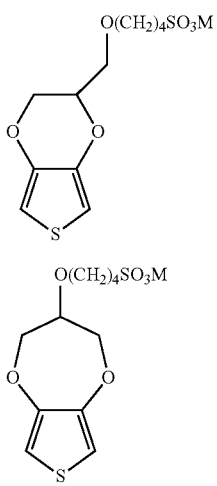

and wherein the content thiophene monomers of the general formula (Ib) is less than 20 wt.-%, preferably less than 18 wt.-%, more preferably less than 16 wt.-%, more preferably less than 14 wt.-%, more preferably less than 12 wt.-% and most preferably less than 10 wt.-% and the content of thiophene monomers of the general formula (Ia) is more than 80 wt.-%, more preferably more than 82 wt.-%, more preferably more than 84 wt.-%, more preferably more than 86 wt.-%, more preferably more than 88 wt.-% and most preferably more than 90 wt.-%, in each case based on the total weight of the thiophene monomers in the liquid phase, wherein the content of thiophene monomers of the general formula (Ia) and the content of thiophene monomers of the general formula (Ib) preferably sum up to 100 wt.-%;
  a) an oxidizing agent; and
  b) a solvent;
 ii) oxidatively polymerizing the thiophene monomers of the general formula (Ia) and (Ib) to obtain a liquid composition comprising functionalized π-conjugated polythiophenes.
XXVI. The process according to embodiment XXV, wherein the content of thiophene monomers of the general formula (Ib) is at least 0.2 wt.-%, preferably at least 1 wt.-% and more preferably at least 2 wt.-%, in each case based on the total weight of the thiophene monomers in the liquid phase.
XXVII. A liquid composition, obtainable by the process according to embodiment XXV or XXVI.
XXVIII. A liquid composition comprising a functionalized π-conjugated polythiophene, wherein the polythiophene comprises repeating units of the general formula (I)

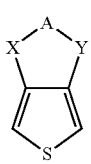

wherein X, Y and A are as defined in embodiment I, III, IV and V, wherein the functionalized π-conjugated polythiophene comprises repeating units of the general formula (Ia) and repeating units of the general formula (Ib)

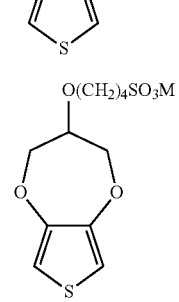

and wherein the content of repeating units of the general formula (Ib) is less than 20 wt.-%, preferably less than 18 wt.-%, more preferably less than 16 wt.-%, more preferably less than 14 wt.-%, more preferably less than 12 wt.-% and most preferably less than 10 wt.-% and the content of repeating units of the general formula (Ia) is more than 80 wt.-%, more preferably more than 82 wt.-%, more preferably more than 84 wt.-%, more preferably more than 86 wt.-%, more preferably more than 88 wt.-% and most preferably more 90 wt.-%, in each case based on the total weight of the functionalized π-conjugated polythiophene, wherein the content of repeating units of the general formula (Ia) and the content of repeating units of the general formula (Ib) preferably sum up to 100 wt.-%.
XXIX. The liquid composition according to embodiment XVIII, wherein the content of repeating units of the general formula (Ib) is at least 0.2 wt.-%, preferably at least 1 wt.-% and more preferably at least 2 wt.-%, in each case based on the total weight of the functionalized π-conjugated polythiophene.
XXX. The liquid composition according to anyone of embodiments XVI to XXIV and XXVII to XXIX, wherein a conductive layer made by the liquid composition has a conductivity of more than 12 S/cm.
XXXI. A process for the production of a capacitor, comprising the process steps:
  I) the provision of an electrode body of an electrode material, wherein a dielectric covers one surface of this electrode material at least partly under formation of an anode body;
  II) the introduction of a liquid composition according to anyone of embodiments XVI to XXIV and XXVII to XXX into at least a part of the electrode body.
XXXII. A capacitor obtainable by the process according to embodiment XXXI.
XXXIII. Use of the liquid composition according to anyone of embodiments XVI to XXIV and XXVII to XXX for the preparation of a conductive layer in an electronic device.

XXXIV. The use according to embodiment XXXIII, wherein the device is selected from photoconductive cells, photoresistors, photoswitches, phototransistors, phototubes, IR detectors, photovoltaic device, solar cells, coating materials for memory storage devices, field effect resistance devices, anti-static films, biosensors, electrochromic devices, solid electrolyte capacitors, energy storage devices, touch panels and electromagnetic shielding.

XXXV. The use according to embodiment XXXIII, wherein the conductive layer is a solid electrolyte layer in a solid electrolyte capacitor.

A contribution towards solving these objects is made by a first process for producing a liquid composition comprising functionalized π-conjugated polythiophenes, the process comprising the steps of i) providing a liquid phase comprising
   a) thiophene monomers of the general formula (I)

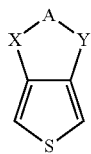

(I)

wherein
   X,Y are identical or different and are O, S, or $NR^1$, wherein $R^1$ is hydrogen or an aliphatic or aromatic residue having 1 to 18 carbon atoms;
   A is an organic residue carrying an anionic functional group, preferably an anionic functional group selected from the group consisting of $CO_2^-$, $—SO_3^-$ and $—OSO_3^-$, wherein $—SO_3^-$ is particularly preferred;
   b) an oxidizing agent; and
   c) a solvent;

ii) oxidatively polymerizing the thiophene monomers of the general formula (I) to obtain a liquid composition comprising functionalized π-conjugated polythiophenes;
wherein
(α1) the pH of the liquid phase provided in process step i) is adjusted to a value below 7.0, preferably below 6.0, more preferably below 5.0, more preferably below 4.0, more preferably below 3.0, more preferably below 2.0 and most preferably below 1.0, wherein the pH is determined at a temperature of 20° C.; and
(α2) the chloride content of the liquid phase provided in process step i) is less than 10000 ppm, more preferably less than 5000 ppm, more preferably less than 1000 ppm, more preferably less than 500 ppm and most preferably less than 100 ppm, in each cased based on the total weight of the aqueous phase.

Surprisingly it has been discovered that liquid composition comprising functionalized π-conjugated polythiophenes (like PEDOT-S) that enable the formation of conductive layers with an increased conductivity can be prepared by oxidative polymerisation of the corresponding monomers pursuant to the process disclosed in EP 1 122 274 A1, provided that the pH of the monomer solution prior to the polymerization reaction is adjusted to a value below 7.0 and that the chlorine content in this monomer solution is kept below 10000 ppm.

In process step i) of the first process according to the present invention a liquid phase is provided that comprises the thiophene monomer a), an oxidizing agent b) and a solvent c).

According to a first embodiment of the first process according to the present invention the thiophene monomers a) are those disclosed in EP 1 122 274 A1. According to a preferred embodiment of these thiophene monomers a) X and Y in the general formula (I) are both oxygen (O), wherein it is particularly preferred that
A is $—(CH_2)_m—R^2R^3—(CH_2)_n—$,
   wherein
   $R^2$ is hydrogen or $—(CH_2)_s—O—(CH_2)_p—SO_3^-M^-$,
   $R^3$ is $—(CH_2)_s—O—(CH_2)_p—SO_3^-M^+$,
   $M^+$ is a cation, preferably $H^+$, $Li^+$, $Na^+$, $K^+$, $Rb^+$, $Cs^+$ or $NH_4^+$, particularly preferred $Na^+$ or $K^+$,
   m and n are identical or different and are an integer from 0 to 3, preferably 0 or 1,
   s is an integer from 0 to 10, preferably 0 or 1, and
   p is an integer from 1 to 18, preferably 4 or 5;
In this context it is even more preferred that
A is $—(CH_2)—CR^2R^3—(CH_2)_n—$,
   wherein
   $R^2$ is hydrogen,
   $R^3$ is $—(CH_2)_s—O—(CH_2)_p—SO_3^-M^+$,
   $M^+$ is $Na^+$ or $K^+$,
   n is 0 or 1,
   s is 0 or 1, and
   p is 4 or 5.

The most preferred functionalized π-conjugated polythiophene in connection with the first embodiment of the process according to the present invention is poly(4-(2,3-dihydrothieno[3,4-b][1,4]dioxin-2-ylmethoxy)-1-butanesulfonic acid) (PEDOT-S) and the most preferred thiophene monomers a) is therefore 4-(2,3-dihydrothieno[3,4-b][1,4]dioxin-2-yl-methoxy)-1-butanesulfonic acid (EDOT-S). The EDOT-S monomer that is used for the preparation of PEDOT-S, however, may comprise a certain amount of PRODOT-S (4-(3, 4-dihydro-2H-thieno [3,4-b][1,4]dioxepin-3-yl)-1-butanesulfonic acid) as it is disclosed in EP 1 564 250 A1. According to a second embodiment of the first process according to the present invention the thiophene monomers a) are those disclosed in JP 2014-028760 A. In this context it is therefore preferred that in the general formula (I)
X, Y are O,
A is $—(CH_2—CHR)—$,
   wherein
   R is $—(CH_2)_t—O—Ar—[(W)_u—SO_3^-M^+]_v$,
      wherein
      Ar represents an optionally substituted $C_6$-$C_{20}$ arylene group;
      W represents an optionally substituted $C_1$-$C_6$ alkylene group;
      $M^+$ represents $H^+$, an alkali cation selected from the group consisting of $Li^+$,
      $Na^+$, and $K^+$, $NH(R^1)_3$ or $HNC_5H_5$, wherein each $R^1$ group independently represent a hydrogen atom or an optionally substituted $C_1$-$C_6$ alkyl group;
      t represents an integer of 0 to 6;
      u represents an integer of 0 or 1; and
      v represents an integer of 1 to 4.

In this context particularly preferred thiophene monomers are those that are explicitly mentioned in paragraph [0049] of JP 2014-028760 A.

The oxidation reaction that is performed in process step ii) can be catalyzed by a chemical oxidizing agent, by electrochemical oxidation or by a combination of both methods. In case of an electrochemical oxidation an electrode functions als the oxidizing agent b).

Suitable oxidizing agents b) used as chemical oxidizing agents are salts of heavy metals, preferably iron salts, more preferably FeCl$_3$ and iron(III) salts of aromatic and aliphatic sulfonic acids, H$_2$O$_2$, K$_2$Cr$_2$O$_7$, salts of a salt of a peroxodisulfate, such as K$_2$S$_2$O$_8$, Na$_2$S$_2$O$_8$, KMnO$_4$, alkali metal perborates, and alkali metal or ammonium persulfates, or mixtures of these oxidants. Particularly preferred are salts of a heavy metal, salts of a peroxodisulfate or a mixture thereof. Further suitable oxidants are described, for example, in Handbook of Conducting Polymers (Ed. Skotheim, T. A.), Marcel Dekker: New York, 1986, Vol. 1, pages 46-57. Particularly preferred oxidizing agents b) are salts of a peroxodisulfate, in particular K$_2$S$_2$O$_8$, Na$_2$S$_2$O$_8$, iron salts, in particular iron(III) chloride, or mixtures of salts of a peroxodisulfate and at least one further compound that catalyzes the cleavage of the peroxodisulfate, like mixtures of salts of a peroxodisulfate and iron salts. However, in view of the requirement ($\alpha$2), according to which the chloride content of the liquid phase provided in process step i) is less than 10000 ppm, those oxidizing agents b) are preferred that either do not comprise any chloride or that comprise chloride in such a low content that requirement ($\alpha$2) is still fulfilled. According to an particularly preferred embodiment of the process according to the present invention the oxidizing agent is a mixture of Fe$_2$(SO$_4$)$_3$ and Na$_2$S$_2$O$_8$.

Suitable solvents c) that can be used in the first process according to the present invention are water, water-miscible solvents, in particular those selected from the group consisting aliphatic alcohols, such as methanol, ethanol, isopropanol and butanol, diacetone alcohols, ethylene glycol and glycerol, aliphatic ketones, such as acetone and methyl ethyl ketone, aliphatic nitriles, such as acetonitrile or a mixture of at least two of these solvents, in particular a mixture of water and a water-miscible solvent. The most preferred solvent, however, is water. In case of 4-(2,3-dihydrothieno[3,4-b][1,4]dioxin-2-ylmethoxy)-1-butanesulfonic acid (EDOT-S) as the thiophene monomer a) the first process according to the present invention therefore enables the production of an aqueous PEDOT-S solution.

The concentration of the thiophene monomer a) in the aqueous phase provided in process step i) is preferably in a range from 0.1 to 25 wt.-%, preferably in a range from 0.5 to 10 wt.-%.

There are different ways of preparing the liquid phase provided in process step i). The thiophene monomer a) can be dissolved or dispersed in the solvent c), followed by the addition of the oxidizing agent(s) b) (which can also be dissolved or dispersed in a solvent separately), or the oxidizing agent(s) b) is/are first dissolved or dispersed in the solvent c), followed by the addition of the thiophene monomer a) (which can also be dissolved or dispersed in a solvent separately). If more than one oxidizing agent is used, like a mixture of Fe$_2$(SO$_4$)$_3$ and Na$_2$S$_2$O$_8$, it is furthermore possible to first mix one of these components with the thiophene monomer a) and the solvent c) and to finally add the second oxidizing agent.

Irrespective the way in which the liquid phase is prepared in process step i), it is particularly preferred to reduce the oxygen content in the components that are used to prepare the liquid phase to such an extent that the oxygen content in the liquid phase is below 1000 ppm, more preferably less than 500 ppm, more preferably less than 100 ppm, more preferably less than 10 ppm, more preferably less than 1 ppm, more preferably less than 0.5 ppm and most preferably less than 0.25 ppm, in each case based on the total weight of the liquid phase. According to a particularly preferred embodiment of the process according to the present invention the components that are used to prepare the liquid phase are completely free of any oxygen (i. e. the oxygen content is 0 ppm).

The reduction of the oxygen content can, for example, be accomplished by stirring the components used to prepare the liquid phase under a reduced pressure, by using ultra sound or by degasing these components using an inert gas such as N$_2$, argon, CO$_2$ or a mixture thereof, or by a combination of the above mentioned approaches.

The polymerization reaction in process step ii) is preferably performed at a temperature in the range from –20° C. to 200° C., preferably from 0° C. to 100° C. and for a duration of preferably 1 to 48 hours, more preferably for 5 to 20 hours.

After the polymerization reaction is completed, the liquid composition comprising the functionalized $\pi$-conjugated polymer, preferably the aqueous solution of PEDOT-S, may be further purified, for example by means of filtration, in particular by means of ultrafiltration, and/or by a treatment with ion exchanger in a further process step iii), in particular by a treatment with an anion exchanger and a cation exchanger, for the purpose of further purification. It is also possible to add further additives as described below in connection with the process for the production of a capacitor.

Furthermore, as the functionalized $\pi$-conjugated polythiophenes obtained after polymerisation in process step ii) is usually present in the form of particles, the particle size distribution of the functionalized $\pi$-conjugated polythiophenes in the liquid composition obtained in process step ii) or that—after further purification—is obtained in process step iii) can be adjusted by a treatment of the liquid composition with ultrasound, wherein the energy input is preferably between 10-1000 Watts/liter (W/l), more preferably between 20-500 W/l and the ultrasound frequency is preferably between 20-200 kHz, by a treatment of the liquid composition with high pressure homogenization, wherein pressures higher than 100 bar, preferably higher than 500 bar, more preferably higher than 1500 bar, more preferably higher than 2500 bar, more preferably higher than 3500 bar and most preferably higher than 4500 bar are applied preferably multiple times, or by a treatment of the liquid composition with heat, wherein the heat treatment preferably comprises a treatment of the liquid composition at a temperature in the range from 40 to 100° C., preferably at a range from 50 to 95° C. for a duration of 5 minutes to 100 hours, preferably 1 to 10 hours and more preferably 2 to 8 hours.

The first process according to the present invention is now characterized in that ($\alpha$1) the pH of the liquid phase provided in process step i) is adjusted to a value below 7.0, preferably below 6.0, more, more preferably below 5.0, more preferably below 4.0, more preferably below 3.0, more preferably below 2.0 and most preferably below 1.0, wherein the pH is determined at a temperature of 20° C.; and ($\alpha$2) the chloride content of the liquid phase provided in process step i) is less than 10000 ppm, preferably less than 5000 ppm, more preferably less than 1000 ppm, more preferably less than 500 ppm and most preferably less than 100 ppm, in each cased based on the total weight of the aqueous phase.

Adjusting the pH-value to a value below 7.0 as defined in requirement ($\alpha$1) is—in view of the requirement defined in ($\alpha$2)—preferably accomplished using an inorganic or organic acid, preferably an organic or inorganic acid that is substantially free of chloride. Suitable organic acids include carboxylic acids such as formic acid, acetic acid, lactic acid, propionic acid, citric acid, malic acid, fumaric acid or mixtures thereof. Suitable inorganic acids are in particular sulfuric acid, sulfonic acid, nitric acid, phosphonic acid, phosphoric acid or mixtures thereof. It is also possible to use a chloride-containing co-acid, such as hydrochloric acid, in combination with one of these organic or inorganic chloride-free acids, as long as these co-acids are used in such a low amount that requirement (α2) is still fulfilled. According to a particularly preferred embodiment of the process according to the present invention sulfuric acid is used for the adjustment of the pH.

Adjusting the chloride content of the liquid phase provided in process step i) to be less than 10000 ppm as defined in requirement (α2) is preferably accomplished by choosing components a), b) and c), in particular by choosing oxidizing agents b), which are substantially free of chloride. If necessary, the chloride content of the components used to prepare the liquid phase can be additionally reduced by the treatment of these components with anion exchangers.

According to a particularly preferred embodiment of the first process according to the present invention it is also advantageous that (α3) the oxygen content of the liquid phase provided in process step i) is less than 1000 ppm, preferably less than 500 ppm, more preferably less than 100 ppm, more preferably less than 10 ppm, more preferably less than 1 ppm, more preferably less than 0.5 ppm and most preferably less than 0.25 ppm, in each case based on the total weight of the liquid phase. According to a particularly preferred embodiment of the process according to the present invention the oxygen content of the liquid phase provided in process step i) is completely free of any oxygen (i. e. the oxygen content is 0 ppm).

There are different approaches of adjusting the oxygen content in the liquid phase that is provided in process step i) and also to maintain this low oxygen content during the polymerization reaction in process step ii).

According to one approach the liquid phase provided in process step i) (or the liquid components that are used to prepare the liquid phase) can be degassed, for example by introducing an inert gas such as $N_2$, Argon, $CO_2$ or a mixture thereof into the liquid phase provided in process step i) to reduce the initial oxygen content in the liquid phase. Alternatively, the liquid phase provided in process step i) (or the liquid components that are used to prepare the liquid phase) can be subjected to a treatment with a reduced pressure in order to reduce the initial oxygen content, for example by stirring the liquid phase while applying a vacuum, or can be subjected to a treatment with ultra sound or can be subjected to a combination of a treatment with a reduced pressure and a treatment with ultra sound.

In order to ensure that the low oxygen content is maintained during the polymerization reaction in process step ii) it may be advantageous to perform the polymerization reaction under an inert gas atmosphere, preferably under a $N_2$-atmosphere, under a $CO_2$-atmosphere, under an argon atmosphere or under an atmosphere of a mixture of at least two of these inert gases, wherein it may also be advantageous that the oxidative polymerization in process step ii) is performed under a pressure that is equal to or above the vapor pressure of the liquid phase during the polymerization reaction in process step ii). Preferably, the oxidative polymerization in process step ii) is performed under a pressure that is at least 0.1 mbar, more preferably at least 0.5 mbar and most preferably at least 1 mbar above the vapor pressure of the liquid phase during the polymerization reaction in process step ii). To ensure that the low oxygen content is maintained during the polymerization reaction in process step ii) it is also possible to perform the oxidative polymerization in process step ii) under a reduced pressure, preferably under a pressure of not more than 0.8 bar and most preferably under a pressure of not more than 0.5 bar.

A contribution towards achieving the abovementioned objects is also made by a liquid composition comprising functionalized π-conjugated polythiophenes, preferably by an aqueous PEDOT-S solution, that is obtainable by the first process according to the present invention, preferably by a liquid composition comprising functionalized π-conjugated polythiophenes, in particular an aqueous PEDOT-S solution, that has been obtained by the first process according to the present invention.

A contribution towards achieving the abovementioned objects is also made by a first liquid composition comprising a functionalized π-conjugated polythiophene, wherein the polythiophene comprises repeating units of the general formula (I)

(I)

wherein X, Y and A are as defined in connection with the first process according to the present invention and wherein the ratio of the mass average molecular weight $M_w$ to the molar average molecular weight $M_n$ ($M_w/M_n$) of the functionalized π-conjugated polythiophene is at least 6, preferably at least 8, more preferably at least 10, more preferably at least 12, more preferably at least 14, more preferably at least 16, more preferably at least 18 and more preferably at least 20.

In the functionalized π-conjugated polythiophene that is comprised in the first liquid composition according to the present invention (but also in the functionalized π-conjugated polythiophene that is comprised in the second liquid composition according to the present invention as described later) repeating units of the general formula (I) are bonded to each other as shown in the following formula (I')

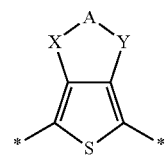

(I')

in which the asterisks (*) indicate the bond to the adjacent repeating units. Preferably, the functionalized π-conjugated polythiophene has positive charges along the polymer chain (not shown in formula (I')) and these positive charges are at least partly compensated by the anionic functional groups in organic residues A.

Surprisingly, it has been discovered that an $M_w/M_n$-value of at least 6 significantly helps to improve the properties of the functionalized π-conjugated polythiophene, in particular if the functionalized π-conjugated polythiophene is used for the formation of a solid electrolyte in a solid electrolyte capacitor. If a functionalized π-conjugated polythiophene such as PEDOT-S with an $M_w/M_n$-value of at least 6 is used, solid electrolyte capacitors with an improved capacitance and an improved ESR can be obtained compared to a solid electrolyte capacitor the solid electrolyte layer is prepared using PEDOT-S with an $M_w/M_n$-value of about 4.4 (such a PEDOT-S with $M_w$=123000 g/mol and $M_n$=28000 g/mol is, for example, disclosed in chapter 12.4 of "PEDOT Principles an Applications of an Intrinsically Conductive Polymer", Elschner et al. (2011), CRC. According to a preferred embodiment of the liquid composition according to the present invention the value of $M_w/M_n$ is at most 100, preferably at most 75 and more preferably at most 50.

It is furthermore preferred that the mass average molecular weight $M_w$ of the functionalized π-conjugated polythiophene is at least 50000 g/mol, preferably at least 75000 g/mol, more preferably at least 100000 g/mol and most preferably at least 125000 g/mol. It furthermore has been shown to be advantageous that the mass average molecular weight $M_w$ of the functionalized π-conjugated polythiophene is in the range from 125000 g/mol to 240000 g/mol and preferably in the range from 125000 g/mol to 210000 g/mol.

Furthermore, it is also preferred that the molar average molecular weight $M_n$ of the functionalized π-conjugated polythiophene is less than 25000 g/mol, preferably less than 20000 g/mol and more preferably less than 15000 g/mol.

As stated above, the functionalized π-conjugated polythiophene—in particular if it has been prepared by means of the first process according to the present invention—is usually present in the form of particles. In this context it is particularly preferred that the particle size distribution of these particles is characterized by
i) a $d_{50}$-value (weight average particle diameter) in the range from 1 to 100 nm, preferably in the range from 1 to 80 nm, more preferably in the range from 1 to 60 nm and most preferable in the range from 5 to 40 nm, and
ii) a $d_{90}$-value of less than $3.5 \times d_{50}$, preferably less than $3 \times d_{50}$ and more preferably less than $2 \times d_{50}$.

In connection with the first liquid composition according to present invention comprising the functionalized π-conjugated polythiophene with the above defined values for $M_w$, $M_n$ and $M_w/M_n$ it is furthermore preferred that the functionalized π-conjugated polythiophene comprises repeating units of the general formula (Ia) and repeating units of the general formula (Ib)

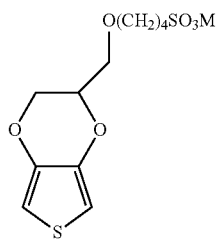
(Ia)

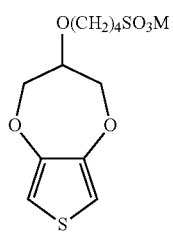
(Ib)

wherein the content of repeating units of the general formula (Ib) is less than 20 wt.-%, preferably less than 18 wt.-%, more preferably less than 16 wt.-%, more preferably less than 14 wt.-%, more preferably less than 12 wt.-% and most preferably less than 10 wt.-% and the content of repeating units of the general formula (Ia) is more than 80 wt.-%, more preferably more than 82 wt.-%, more preferably more than 84 wt.-%, more preferably more than 86 wt.-%, more preferably more than 88 wt.-% and most preferably more than 90 wt.-%, in each case based on the total weight of the functionalized π-conjugated polythiophene, wherein it is preferred that the content of repeating units of the general formula (Ib) and the content of repeating units of the general formula (Ia) sum up to 100 wt.-% (i. e. that the functionalized π-conjugated polythiophene consists of only these two repeating units). In this context it is furthermore preferred that the content of repeating units of the general formula (Ib) is at least 0.2 wt.-%, preferably at least 1 wt.-% and more preferably at least 2 wt.-%, in each case based on the total weight of the functionalized π-conjugated polythiophene. The content relative amounts of repeating units of the general formula (Ia) and (Ib) in the functionalized π-conjugated polythiophene can be adjusted using a liquid phase that comprises the corresponding monomers in appropriate relative amounts and by oxidatively polymerizing these monomers pursuant to the process according to the present invention.

A contribution towards achieving the abovementioned objects is also made by a second process for producing a liquid composition comprising functionalized π-conjugated polythiophenes, the process comprising the steps of
i) providing a liquid phase comprising
  a) thiophene monomers of the general formula (I)

(I)

wherein X, Y and A are as defined above,
wherein the liquid phase comprises a mixture of thiophene monomers of the general formula (Ia) and thiophene monomers of the general formula (Ib)

(Ia)

(Ib)

and wherein the content thiophene monomers of the general formula (Ib) is less than 20 wt.-%, preferably less than 18 wt.-%, more preferably less than 16 wt.-%, more preferably less than 14 wt.-%, more preferably less than 12 wt.-% and most preferably less than 10 wt.-% and the content of thiophene monomers of the general formula (Ia) is more than 80 wt.-%, more preferably more than 82 wt.-%, more preferably more than 84 wt.-%, more preferably more than 86 wt.-%, more preferably more than 88 wt.-% and most preferably more than 90 wt.-%, in each case based on the total weight of the thiophene monomers in the liquid phase, wherein the content of thiophene monomers of the general formula (Ia) and the content of thiophene monomers of the general formula (Ib) preferably sum up to 100 wt.-%;
b) an oxidizing agent; and
c) a solvent;
ii) oxidatively polymerizing the thiophene monomers of the general formula (Ia) and (Ib) to obtain a liquid composition comprising functionalized π-conjugated polythiophenes.

Surprisingly, it also has been discovered that if a functionalized π-conjugated polythiophene is used for the formation of a solid electrolyte layer in a solid electrolyte capacitor that has been prepared by means of a thiophene monomer that comprises less than 20 wt.-% of thiophene monomers of the general formula (Ib) and more than 80 wt.-% of thiophene monomers of the general formula (Ia), the properties of the capacitor in terms of the capacitance and the ESR can be significantly improved. As stated above, the EDOT-S monomer (repeating unit of the general formula (Ia)) that is used for the preparation of PEDOT-S may comprise a certain amount of PRODOT-S (repeating unit of the general formula (Ib)) as it is disclosed in EP 1 564 250 A1. Adjusting the content of PRODOT-S to a value of less than 20 wt.-% and preferably to a value within the range from 0.1 to not more than 14 wt.-%, more preferably from 1 to not more than 12 wt.-% and even more preferably from 2 to not more than 10 wt.-% has shown to be particularly advantageous if such a functionalized π-conjugated polythiophene is used for the formation of a solid electrolyte layer in a solid electrolyte capacitor. In this context it is also preferred than the content of thiophene monomers of the general formula (Ib) is at least 0.2 wt.-%, preferably at least 1 wt.-% and more preferably at least 2 wt.-%, in each case based on the total weight of the thiophene monomers in the liquid phase.

Preferred solvents and oxidizing agents are those that have been mentioned in connection with the first process according to the present invention.

A contribution towards achieving the abovementioned objects is also made by a liquid composition comprising functionalized π-conjugated polythiophenes, preferably by an aqueous PEDOT-S solution, that is obtainable by the second process according to the present invention, preferably by a liquid composition comprising functionalized π-conjugated polythiophenes, in particular an aqueous PEDOT-S solution, that has been obtained by the second process according to the present invention.

A contribution towards achieving the abovementioned objects is also made by a second liquid composition comprising a functionalized π-conjugated polythiophene, wherein the polythiophene comprises repeating units of the general formula (I)

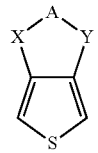

wherein X,Y and A are as defined in connection with the first process according to the present invention, wherein the functionalized π-conjugated polythiophene comprises repeating units of the general formula (Ia) and repeating units of the general formula (Ib)

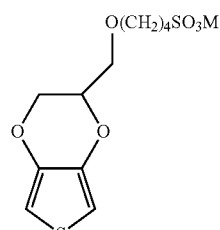

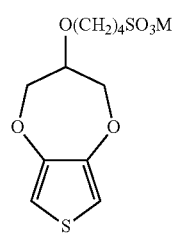

and wherein the content of repeating units of the general formula (Ib) is less than 20 wt.-%, preferably less than 18 wt.-%, more preferably less than 16 wt.-%, more preferably less than 14 wt.-%, more preferably less than 12 wt.-% and most preferably less than 10 wt.-% and the content of repeating units of the general formula (Ia) is more than 80 wt.-%, more preferably more than 82 wt.-%, more preferably more than 84 wt.-%, more preferably more than 86 wt.-%, more preferably more than 88 wt.-% and most preferably more than 90 wt.-%, in each case based on the total weight of the functionalized π-conjugated polythiophene, wherein it is preferred that the content of repeating units of the general formula (Ib) and the content of repeating units of the general formula (Ia) sum up to 100 wt.-% (i. e. that the functionalized π-conjugated polythiophene consists of only these two repeating units). In this context it is also preferred that the content of repeating units of the general formula (Ib) is at least 0.2 wt.-%, preferably at least 1 wt.-% and more preferably at least 2 wt.-%, in each case based on the total weight of the functionalized π-conjugated polythiophene.

In this context it is particularly preferred that a conductive layer made by the liquid composition that is obtainable by the first or second process according to the present invention, the first liquid composition according to the present invention comprising a functionalized π-conjugated polythiophene with a well defined $M_w/M_n$-value and the second liquid composition according to the present invention comprising a functionalized π-conjugated polythiophene comprising a well defined relative amount of repeating units of the general formula (Ia) and (Ib) have a conductivity of more than 12 S/cm, preferably more than 14 S/cm, more preferably more than 16 S/cm, preferably more than 18 S/cm, more preferably more than 20 S/cm, more preferably more than 25 S/cm, more preferably more than 40 S/cm, more preferably more than 60 S/cm and most preferably more than 80 S/cm.

A contribution towards achieving the abovementioned objects is also made by a process for the production of a capacitor, comprising the process steps:
I) the provision of an electrode body of an electrode material, wherein a dielectric covers one surface of this electrode material at least partly under formation of an anode body;
II) the introduction of a liquid composition that is obtainable by the first or second process according to the present invention, of the first liquid composition according to the present invention comprising a functionalized π-conjugated polythiophene with a well defined $M_w/M_n$-value or of the second liquid composition according to the present invention comprising a functionalized π-conjugated polythiophene comprising a well defined relative amount of repeating units of the general formula (Ia) and (Ib) into at least a part of the electrode body.

In process step I), an electrode body of an electrode material, wherein a dielectric covers one surface of this electrode material at least partly to form an anode body, is first provided.

In principle, the electrode body can be produced by pressing a valve metal powder of high surface area and sintering it to give a usually porous electrode body. An electrical contact wire, preferably of a valve metal, such as e.g. tantalum, is conventionally also pressed into the electrode body here. The electrode body is then coated, for example by electrochemical oxidation, with a dielectric, i.e. an oxide layer. Alternatively, metal foils can also be etched, and coated with a dielectric by electrochemical oxidation in order to obtain an anode foil having a porous region. In a wound capacitor, an anode foil having a porous region, which forms the electrode body, and a cathode foil are separated by separators and wound up.

In the context of the invention, valve metal is to be understood as meaning those metals of which the oxide layers do not render possible current flow equally in both directions. In the case of an anodically applied voltage, the oxide layers of the valve metals block the current flow, while in the case of a cathodically applied voltage large currents occur, which may destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The best known representatives of the valve metals are Al, Ta and Nb. Compounds which have electrical properties comparable to a valve metal are those having metallic conductivity, which can be oxidized and of which the oxide layers have the properties described above. For example, NbO has metallic conductivity, but in general is not regarded as a valve metal. Layers of oxidized NbO have, however, the typical properties of valve metal oxide layers, so that NbO or an alloy or compound of NbO with other elements are typical examples of such compounds which have electrical properties comparable to a valve metal. Electrode materials of tantalum, aluminium and those electrode materials based on niobium or niobium oxide are preferred. Tantalum and aluminium are very particularly preferred as the electrode material.

For production of the electrode body, often with a porous region, the valve metals can be sintered, for example in powder form, to give a usually porous electrode body, or a porous structure is stamped on a metallic body. The latter can be carried out e.g. by etching a foil.

For simplicity, bodies having a porous region are also called porous in the following. Thus, for example, electrode bodies having a porous region are also called porous electrode bodies. On the one hand, the porous bodies can be permeated by a plurality of channels and therefore be sponge-like. This is often the case if tantalum is used for construction of the capacitor. Furthermore, it is possible for only the surface to have pores and for the region following under the surface pores to be solid in construction. Such a situation is often observed if aluminium is used for construction of the capacitor. Preferably, the electrode body is porous.

The often porous electrode bodies produced in this manner are then oxidized, for example, in a suitable electrolyte, such as e.g. phosphoric acid or an aqueous solution of ammonium adipate, by application of a voltage, in order to form the dielectric. The level of this formation voltage depends on the oxide layer thickness to be achieved or the later use voltage of the capacitor. Preferred formation voltages lie in a range of from 1 to 1000 V, particularly preferably in a range of from 2 to 500 V, very particularly preferably in a range of from 1 to 300 V. According to a first particular embodiment of the process for the production of a capacitor the formation voltage is in a range of from 1 to 20 V, whereas according to a second particular embodiment of the process for the production of a capacitor the formation voltage is in a range of from 30 to 100 V.

The as a rule porous electrode bodies employed preferably have a porosity of from 10 to 90%, preferably from 30 to 80%, particularly preferably from 50 to 80% and an average pore diameter of from 10 to 10000 nm, preferably from 20 to 5000 nm, particularly preferably from 50 to 3000 nm.

According to a particular embodiment of the process according to the invention, the electrolyte capacitor to be produced is an aluminium wound capacitor. In this case, in process step a) a porous aluminium foil is formed anodically as the electrode material, an aluminium oxide coating being formed as the dielectric. The aluminium foil (anode foil) obtained in this manner is then provided with a contact wire and wound up with a further optionally porous aluminium foil (cathode foil) likewise provided with a contact wire, these two foils being spaced from one another by one or more separators, which are based e.g. on cellulose or, preferably, on synthetic papers. After being wound up, the anode bodies obtained in this way are fixed, for example by means of an adhesive tape. The separator or separators can be carbonized by heating in an oven. This method and manner of production of anode bodies for aluminium wound capacitors is adequately known from the prior art and is described, for example, in U.S. Pat. No. 7,497,879 B2.

According to further particular embodiments of the process according to the invention, the electrolyte capacitor to be produced is an aluminium stacked capacitor or a tantalum electrolytic capacitor ("tantalum elco"), in particular a tantalum electrolytic capacitor having a polymeric outer layer, such as is described in DE-A-10 2009 007 594.

In process step II) of the process according to the invention, the liquid composition that is obtainable by the first or second process according to the present invention, the first liquid composition according to the present invention comprising a functionalized π-conjugated polythiophene with a well defined $M_w/M_n$-value or the second liquid composition according to the present invention comprising a functionalized π-conjugated polythiophene comprising a well defined relative amount of repeating units of the general formula (Ia) and (Ib), preferably an aqueous solution of PEDOT-S, is introduced into at least a part of the anode body. In this context it should be noted that, before introducing the liquid composition obtainable by the first or second process according to the present invention or the first or the second liquid compositions according to the present invention into at least a part of the anode body, other compositions may be introduced into the anode body for the formation of an electrically conductive layer, such as a PEDOT/PSS-dispersion. It is therefore not necessarily required to directly apply the liquid composition obtainable by the first or second process according to the present invention or the first or second liquid compositions according to the present invention onto at least a part of the dielectric layer of the anode body.

The liquid composition is introduced into the porous region by known processes, e.g. impregnation, dipping, pouring, dripping on, spraying, misting on, knife coating, brushing or printing, for example ink-jet, screen or tampon printing. Preferably, the introduction is carried out by dipping the anode body provided in process step a) into the liquid composition and thus impregnating it with this liquid composition. The dipping into or the impregnation with the liquid composition is preferably carried out for a period in a range of from 1 second to 120 minutes, particularly preferably in a range of from 5 seconds to 60 minutes and most preferably in a range of from 10 seconds to 15 minutes. The introduction of the liquid composition into the anode body can be facilitated, for example, by increased or reduced pressure, vibration, ultrasound or heat.

The liquid composition employed in process step II) can, besides the functionalized π-conjugated polymer a), the solvent c) and optionally a reminder of the oxidizing agent b) in its reduced form, moreover comprise further additives, such as surface-active substances, e.g. anionic surfactants, such as e.g. alkylbenzenesulphonic acids and salts, paraffin sulphonates, alcohol sulphonates, ether sulphonates, sulphosuccinates, phosphate esters, alkyl ether carboxylic acids or carboxylates, cationic surfactants, such as e.g. quaternary alkylammonium salts, nonionic surfactants, such as e.g. linear alcohol ethoxylates, oxo alcohol ethoxylates, alkylphenol ethoxylates or alkyl polyglucosides, in particular surfactants that are commercially available under the trademarks Dynol® and Zonyl®, or adhesion promoters, such as e.g. organo functional silanes or hydrolysates thereof, e.g. 3-glycidoxypropyltrialkoxysilane, 3-amino-propyl-triethoxysilane, 3-mercaptopropyltrimethoxysilane, 3-methacryloxypropyltrimethoxysilane, vinyltrimethoxysilane or octyltriethoxysilane, crosslinking agents, such as melamine compounds, masked isocyanates, functional silanes—e.g. tetraethoxysilane, alkoxysilane hydrolysates, e.g. based on tetraethoxysilane, epoxysilanes, such as 3-glycidoxypropyltrialkoxysilane-polyurethanes, polyacrylates or polyolefin dispersions.

Preferably, the liquid composition employed in process step II) comprise further additives which optionally increase the conductivity, such as e.g. compounds containing ether groups, such as e.g. tetrahydrofuran, compounds containing lactone groups, such as γ-butyrolactone, γ-valerolactone, compounds containing amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulphones and sulphoxides, such as e.g. sulpholane (tetramethylene sulphone), dimethylsulphoxide (DMSO), sugars or sugar derivatives, such as e.g. sucrose, glucose, fructose, lactose, sugar alcohols, such as e.g. sorbitol, mannitol, furan derivatives, such as e.g. 2-furancarboxylic acid, 3-furancarboxylic acid, glycerol, diglycerol, triglycerol or tetraglycerol.

The liquid composition employed in process step II) can moreover comprise as an additive one or more organic binders which are soluble in organic solvents, as described in WO 2009/141209 A1 on page 12, lines 16-34. The liquid composition used for the production of the solid electrolyte layer can have a pH of from 1 to 14, and a pH of from 1 to 8 is preferred. For corrosion-sensitive dielectrics, such as, for example, aluminium oxides or niobium oxides, liquid compositions having a pH of from 2.5 to 8 are preferred, in order not to damage the dielectric.

To adjust the pH, for example, bases or acids, as described in WO 2010/003874 A2 on page 4, lines 13-32, can be added as additives to the liquid composition employed in process step II). Those additions which do not impair the film formation of the liquid composition and are not volatile at higher temperatures, e.g. soldering temperatures, but remain in the solid electrolyte under these conditions, such as e.g. the bases 2-dimethylaminoethanol, 2,2'-iminodiethanol or 2,2',2''-nitrilotriethanol and the acid polystyrenesulphonic acid, are preferred.

The viscosity of the liquid composition employed in process step II) can be between 0.01 and 1000 mPa·s (measured with a rheometer at 20° C. and a shear rate of 100 $s^{-1}$), depending on the method of application. Preferably, the viscosity is 1 to 500 mPa·s, particularly preferably between 1 to 250 mPa·s. In the case of the production of aluminium wound capacitors the viscosity is very particularly preferably in a range of from 1 to 200 mPa·s, while in the production of tantalum electrolytic capacitors or aluminium stacked capacitors it is very particularly preferably in a range of from 1 to 50 mPa·s. The adjustment of the viscosity can, for example, be accomplished by adding appropriate rheology modifiers as a further additive.

The solids content of the liquid composition employed in process step II) is preferably in a range of from 0.01 to 20 wt.-%, particularly preferably in a range of from 0.1 to 15 wt.-% and most preferably in a range of from 0.25 to 10 wt.-%, in each case based on the total weight of the liquid composition. The solids content of liquid composition is determined via drying of the liquid composition at a temperature which is sufficiently high to remove the solvent c).

According to a particularly preferred embodiment of the process for the production of a capacitor according to the present invention the liquid composition that is introduced into the capacitor body not only comprises the functionalized π-conjugated polymer, but—in addition to this self-doped conductive polymer—a foreign doped conductive polymer, preferably PEDOT/PSS, as disclosed in WO 2014/048562 A2. The disclosure of WO 2014/048562 A2 regarding the combined use of self-doped polymers like PEDOT-S and foreign-doped polymers like PEDOT/PSS for the formation of a solid electrolyte is incorporated herein by reference and forms a part of the disclosure of the present application.

After the anode bodies have been impregnated with the liquid composition obtainable by the first or second process according to the present invention or with the first or second liquid composition according to the present invention as described above, it is advantageous to at least partially remove the solvent c) contained in the liquid composition in a subsequent process step III), so that a solid electrolyte which completely or partly covers the dielectric, and therefore a capacitor body is formed. In this context it is preferable for the covering of the dielectric by the solid electrolyte to be preferably at least 10%, particularly preferably at least 25% and most preferably at least 50%, it being possible for the covering to be determined by measurement of the capacitance of the capacitor in the dry and in the damp state at 120 Hz, as is described in DE-A-10 2005 043 828.

The removal or hardening is preferably carried out by removing the electrode body from the liquid composition and drying it, the drying preferably being carried out at a temperature in a range of from 20° C. to 260° C., particularly preferably in a range of from 50° C. to 220° C. and most preferably in a range of from 80° C. to 200° C. It is, of course, also possible to at least partially remove the solvent c) by freeze drying. Process steps II) and III) can also be repeated once or several times, in order in this manner to adapt the thickness of the layer of the solid electrolyte deposited on the dielectric or the degree of filling of the electrolyte in the electrode body to the particular requirements.

After the capacitor bodies have been produced in this manner, they can be further modified by the method and manner known to the person skilled in the art. In the case of a tantalum electrolytic capacitor, the capacitor bodies can be covered, for example, with a polymeric outer layer, as is described in DE-A-10 2004 022674 or DE-A-10 2009 007 594, and/or a graphite layer and a silver layer, as is known from DE-A-10 2005 043 828, while in the case of an aluminium wound capacitor, in accordance with the teaching of U.S. Pat. No. 7,497,879 B2, the capacitor body is incorporated into an aluminium beaker, provided with a sealing glass and firmly closed mechanically by crimping. The capacitor can then be freed from defects in the dielectric in a known manner by aging.

A contribution towards achieving the abovementioned objects is also made by a capacitor which is obtainable, preferably has been obtained, by the above described process. Preferably, this capacitor is a tantalum electrolytic capacitor or an aluminium capacitor, for example an aluminium stacked capacitor or an aluminium wound capacitor.

A contribution towards achieving the abovementioned objects is also made the use of the liquid composition obtainable by the first or second process according to the present invention, preferably of the liquid composition that has been obtained by the first or second process according to the preset invention, or by the use the first liquid composition according to the present invention comprising a functionalized π-conjugated polythiophene with a well defined $M_w/M_n$-value or by the use of the second liquid composition according to the present invention comprising a functionalized π-conjugated polythiophene comprising a well defined relative amount of repeating units of the general formula (Ia) and (Ib), for the preparation of a conductive layer in an electronic device, wherein the electronic device is preferably selected from the group consisting of photoconductive cells, photoresistors, photoswitches, phototransistors, phototubes, IR detectors, photovoltaic device, solar cells, coating materials for memory storage devices, field effect resistance devices, anti-static films, biosensors, electrochromic devices, solid electrolyte capacitors, energy storage devices, touch panels and electromagnetic shielding. In this context it is particularly preferred that the liquid composition obtainable by the first or second process according to the present invention, preferably the liquid composition that has been obtained by the first or second process according to the preset invention, the first liquid composition according to the present invention comprising a functionalized π-conjugated polythiophene with a well defined $M_w/M_n$-value or the second liquid composition according to the present invention comprising a functionalized π-conjugated polythiophene comprising a well defined relative amount of repeating units of the general formula (Ia) and (Ib) is used for the preparation of a solid electrolyte layer of a solid electrolyte capacitor. In this context it is particularly preferred to use the liquid composition obtainable by the first or second process according to the present invention, preferably the liquid composition that has been obtained by the first or second process according to the preset invention, the first liquid composition according to the present invention comprising a functionalized π-conjugated polythiophene with a well defined $M_w/M_n$-value or the second liquid composition according to the present invention comprising a functionalized π-conjugated polythiophene comprising a well defined relative amount of repeating units of the general formula (Ia) and (Ib), in a process as disclosed in WO 2014/048562 A2.

The invention is now explained in more detail with the aid of non-limiting figures and examples.

FIG. 1 is a diagram of a section through a part of a capacitor obtainable by the process according to the invention for the production of a capacitor. This has an electrode body 1, usually made of a porous electrode material 2, such as aluminium. On the surface 4 of the electrode material 2, a dielectric 3 is formed as a thin layer, so that an anode body 5 which is still porous and comprises the electrode body 1 of the electrode material 2 and the dielectric 3 is formed. The dielectric 3 is followed, optionally after further layers, by a layer of a solid electrolyte 6 (e.g. a layer that has been prepared using the liquid composition prepared by the process according to the present invention), whereby a capacitor body 7 comprising the electrode body 1 of the electrode material 2, the dielectric 3 and the solid electrolyte 6 is formed.

Test Methods

Conductivity

A cleaned glass substrate was laid on a spin coater and 10 ml of the liquid composition according to the invention was distributed over the substrate. The remaining solution was then spun off by rotation of the plate. Thereafter, the substrate thus coated was dried for 15 minutes at 130° C. on a hot plate. The layer thickness was then determined by means of a layer thickness measuring device. (Tencor, Alphastep 500). The conductivity was determined in that Ag electrodes of 2.5 cm length were vapour deposited at a distance of 10 mm via a shadow mask. The surface resistance determined with an electrometer (Keithly 614) was multiplied by the layer thickness in order to obtain the specific electrical resistivity. The conductivity is the inverse of the specific electrical resistivity.

Oxygen Content

The oxygen content is measured with a Knick Portamess 911 Oxy (Knick Elektronische Messgeräte GmbH & Co. KG, BeuckestraBe 22, Berlin, Germany). Prior to measurement the device is calibrated against ambient air. To determine the oxygen content at the beginning of the reaction the sensor is immersed under nitrogen flow into the reaction solution.

Chloride Content

The chloride content was determined by ion chromatography using the following equipment and measuring conditions:

Equipment: Metrohm 882 Compact IC Plus (Metrohm AG, Ionenstrasse, CH-9100 Herisau, Switzerland)

Software: Metrohm MagIC Net

Column: Metrosep A Supp 5; Particle size: 5 µm; Length 150-25 mm; Diameter 5 mm

Preparation of the Eluent: 3.2 ml of a 1 mol/L sodium carbonate solution and 1 ml of a sodium hydrogen carbonate solution are mixed and 995.8 ml of deionized water are added.

Flow speed 0.7 mL/min

Temperature: room temperature

For calibration the following standard is used: "Chlorid-Standardlösung, 1.000 mg/l CL in Wasser (aus NaCl) ARISTAR® Standard für die Ionenchromatographie", VWR Product code 458012Q 100 mL (VWR International GmbH, Darmstadt). For calibration a concentration series is done by diluting the standard with deionized water in order to calibrate the Ion Chromatography in the relevant range of 0.1 to 30 ppm. If the chloride content of the sample is higher than 30 ppm the sample is diluted with deionized water until the chloride concentration fits into the calibration range. The result is multiplied by the dilution factor in order to calculate the chloride content of the original sample.

Equivalent Series Resistance (ESR)

The equivalent series resistance (in mΩ) was determined at 20° C. at 100 kHz by means of an LCR meter (Agilent 4284A). In each capacitor experiment at least 5 capacitors have been prepared and the average ESR-value was determined.

Capacitance (CAP)

The capacitance (in µF) was determined at 20° C. at 120 Hz by means of an LCR meter (Agilent 4284A). In each capacitor experiment at least 5 capacitors have been prepared and the average capacitance-value was determined.

$M_n$ and $M_w$

The mass average molecular weight $M_w$ and the molar average molecular weight $M_n$ are determined by gel permeation chromatography (GPC) using polystyrene sulfonic acid as standard. A modular GPC system with a HP 1100 1312 pump and three subsequent columns (MCX 1.000, MCX 100.000 and MCX 10.000.000) was used in combination with a HP 1047a Ri detector. The eluent was water. The process temperature was set to 40° C. and a flow rate of 0.5000 ml/min was applied. The calibration standard was polystyrene sulfonic acid. Beforehand of the measurement the PEDOT-S sample was filtered thru a 0.45 µm Cellulose acetate syringe filter.

Composition of the functionalized π-conjugated polythiophene

The relative amount of monomer units of the general formula (Ia) and (Ib) in the thiophene monomer used to prepare the liquid composition comprising functionalized π-conjugated polythiophenes according to the present invention is determined by means of HPLC.

$d_{50}$ and $d_{90}$

The $d_{90}$-value of the diameter distribution states that 90% of the total weight of all the particles of the functionalized π-conjugated polythiophene can be assigned to those particles which have a diameter of less than or equal to the $d_{90}$ value. Accordingly, the $d_{50}$-value of the diameter distribution states that 50% of the total weight of all the particles of the functionalized π-conjugated polythiophene can be assigned to those particles which have a diameter of less than or equal to the $d_{50}$ value (the $d_{50}$-value thus represents the weight average particle diameter).

The determination of $d_{50}$ and $d_{90}$ was carried out via an ultracentrifuge measurement.

Average

If not otherwise mentioned, the average corresponds to the arithmetical average value.

EXAMPLES

For the preparation of a PEDOT-S solutions as described below, the sodium salt of 4-(2,3-dihydrothieno-[3,4-b][1,4]dioxin-2-ylmethoxy)-1-butanesulphonic acid (EDOT-S) was prepared as described by Chevrot et al. (J. Electroanal. Chem. 1998, 443, 217-226) and employed as the monomer.

Synthesis Example 1

Not According to the Present Invention

A 3 L jacketed beaker made of glass is equipped a mechanical stirrer, a thermometer and a nitrogen flow.

Component A

In this beaker 243.6 g (0.9 mol) iron(III)chloride were dissolved in 800 g of deionized water and nitrogen was blown through the solution for 30 minutes while stirring until the oxygen content was below 0.25 mg/l.

Component B

In a separate glass beaker 100 g EDOT-S sodium salt (0.29 mol) were dissolved in 1200 g of deionized water. Nitrogen was blown through this solution via a flexible tube until the oxygen content was below 0.25 mg/l.

Component B was added to component A while stirring. The thus obtained mixture was heated up to 90-95° C. within 6 hours and was kept at this temperature for additional 15 hours. After the reaction was completed, the reaction mixture was filled up to a volume of 10 L by adding deionized water and was subsequently treated by means of ultrafiltration (Pall Microza SLP 1053 with a cut-off of 10000 g/mol), whereby 8 L of water were removed. This procedure was repeated 6 times in order to remove the inorganic salts.

The thus obtained dispersion was characterized by a conductivity of 0.05 S/cm and a solid content of 1.62 wt.-%.

Synthesis Example 2

Not According to the Present Invention

A 3 L jacketed tank made of stainless steel is equipped a mechanical stirrer, a ventilation valve at the upper lid, a material inlet that can be closed and a thermometer.

Component A

Into this tank 2000 g of deionized water, 16.0 g of a 10 wt.-% aqueous iron(III) sulfate solution and 100 g of EDOT-S sodium salt (0.29 mol) were introduced. The stirrer was operated at 50 rpm, the temperature was adjusted to 20° C. and the inner pressure was reduced to 100 hPa. The pressure in the tank was subsequently raised to atmospheric pressure, followed by a further reduction of a pressure to 25 hPa in order to expel the oxygen.

Component B

In a separate glass beaker 78.5 g sodium peroxodisulfate were dissolved in 200 ml water and nitrogen was blown through the solution for 30 minutes while stirring until the oxygen content was below 0.25 mg/l.

Component B was then sucked into the tank. The material inlet was then closed and the inner pressure of the tank was adjusted to 25 hPa by means of a vacuum pump. The reaction was continued for 19 hours under this reduced pressure. After the reaction was completed, the reaction mixture was filled up to a volume of 10 L by adding deionized water and was subsequently treated by means of ultrafiltration (Pall Microza SLP 1053 with a cut-off of 10000 g/mol), whereby 8 L of water were removed. This procedure was repeated 6 times in order to remove the inorganic salts.

The thus obtained dispersion was characterized by a conductivity of 0.09 S/cm and a solid content of 1.05 wt.-%.

Synthesis Example 3

According to the Present Invention

A 3 L jacketed tank made of stainless steel is equipped a mechanical stirrer, a ventilation valve at the upper lid, a material inlet that can be closed and a thermometer.

Component A

Into this tank 2000 g of deionized water, 16.0 g of a 10 wt.-% aqueous iron(III) sulfate solution, 5.7 g sulfuric acid (95 wt.-%) and 100 g of EDOT-S sodium salt (0.29 mol) were introduced. The stirrer was operated at 50 rpm, the temperature was adjusted to 20° C. and the inner pressure was reduced to 100 hPa. The pressure in the tank was subsequently raised to atmospheric pressure, followed by a further reduction of a pressure to 25 hPa in order to expel the oxygen.

Component B

In a separate glass beaker 78.5 g sodium peroxodisulfate were dissolved in 200 ml water and nitrogen was blown through the solution for 30 minutes while stirring until the oxygen content was below 0.25 mg/l.

Component B was then sucked into the tank. The material inlet was then closed and the inner pressure of the tank was adjusted to 25 hPa by means of a vacuum pump. The initial pH of the reaction solution was 1.9 and the reaction was continued for 19 hours under this reduced pressure. After the reaction was completed, the reaction mixture was filled up to a volume of 10 L by adding deionized water and was subsequently treated by means of ultrafiltration (Pall Microza SLP 1053 with a cut-off of 10000 g/mol), whereby 8 L of water were removed. This procedure was repeated 6 times in order to remove the inorganic salts.

The thus obtained composition was characterized by a conductivity of 27 S/cm and a solid content of 1.22 wt.-%. The composition was further concentrated by means of ultra filtration until a solid content of 2.4 wt.-% was reached.

Synthesis Example 4

Preparation of a PEDOT/PSS-Dispersion; Not According to the Present Invention 868 g of deionized water and 330 g of an aqueous polystyrenesulphonic acid solution having an average molecular weight of 70000 g/mol and a solids content of 3.8 wt.-% were initially introduced into a 2 l three-necked flask with a stirrer and internal thermometer. The reaction temperature was kept between 20 and 25° C. 5.1 g of 3,4-ethylenedioxythiophene were added, while stirring. The solution was stirred for 30 min. 0.03 g of iron(III) sulphate and 9.5 g of sodium persulphate were then added and the solution was stirred for a further 24 h. After the reaction had ended, for removal of inorganic salts 100 ml of a strongly acid cation exchanger and 250 ml of a weakly basic anion exchanger were added and the solution was stirred for a further 2 h. The ion exchanger was filtered off. The poly(3,4-ethylenedioxythiophene)/polystyrenesulphonate dispersion was homogenized with a high pressure homogenizer ten times under a pressure of 700 bar. The dispersion was subsequently concentrated to a solids content of 2.5% and then additionally homogenized another five times under a pressure of 1500 bar.

Synthesis Example 5

Preparation of a PEDOT-S Composition According to the Prior Art 0.496 g of EDOT-S (1.5 mmol) were dissolved in 18 ml of dist. water under argon. 0.97 g (6.0 mmol) of $FeCl_3$ was then added in one portion. Thereafter, the solution was stirred at room temperature for 8 h, and heated at 100° C. for 3 h, cooled and worked up. For working up, the solution was diluted to about 3 wt.-% with dist. water, 9 g of Lewatit® S100 and 9 g of Lewatit® MP 62 were added and the mixture was stirred at room temperature for 4 h. After the ion exchangers had been filtered off, a dark blue polymer solution having a solids content of 2.71% was obtained.

Comparative Example 1

Preparation of a Capacitor Pursuant to WO 2014/048562 A2

45 g of the PEDOT/PSS dispersion from Synthesis Example 4, 45 g of the PEDOT-S composition from Synthesis Example 5 and 10 g of polyethylene glykol 400 (PEG-400) were mixed and the pH was adjusted to 3.0 using ammonia (dispersion A).

A porous aluminium foil, formed at 36 V, having dimensions of 200 mm×5 mm (anode foil) and a porous aluminium foil having dimensions of 210 mm×3 mm (cathode foil) were each provided with a contact wire and were then wound up together with two cellulose separator papers and fixed with an adhesive tape. 20 of these oxidized electrode bodies were produced. The separator paper of the oxidized electrode bodies was then carbonized in an oven at 300° C.

The oxidized electrode bodies were impregnated in dispersion A for 15 minutes. Thereafter, drying was carried out at 120° C. for 20 min and then at 150° C. for 20 min. The impregnation and drying were carried out a further time. The mean electrical values have been determined.

Example 1

Preparation of a Capacitor Pursuant to WO 2014/048562 A2

45 g of the PEDOT/PSS dispersion from Synthesis Example 4, 45 g of the PEDOT-S composition from Synthesis Example 3 and 10 g of polyethylene glykol 400 (PEG-400) were mixed and the pH was adjusted to 3.0 using ammonia (dispersion B).

Capacitors were prepared pursuant to the procedure in Comparative Example 1. The mean electrical values have been determined and the results—normalized to the Comparative Example 1—are shown in Table 1.

TABLE 1

|  | CAP | ESR |
| --- | --- | --- |
| Comparative Example 1 | 1.00 | 1.00 |
| Example 1 | 1.01 | 0.53 |

Synthesis Example 6

Preparation of a PEDOT/PSS Dispersion for a Polymeric Outer Layer 1736 g of deionized water and 660 g of an aqueous polystyrenesulphonic acid solution having an average molecular weight of 70000 g/mol and a solids content of 3.8 wt.-% were initially introduced into a 5 l glass reactor with a stirrer and thermometer. The reaction temperature was kept between 20 and 25° C. 10.2 g of 3,4-ethylenedioxythiophene were added, while stirring. The solution was stirred for 30 minutes. 0.06 g of iron(III) sulphate and 19 g of sodium persulphate were then added and the solution was stirred for a further 24 hours. After the reaction had ended, for removal of inorganic salts 200 ml of a strongly acid cation exchanger and 500 ml of a weakly basic anion exchanger were added and the solution was stirred for a further 2 h. The ion exchanger was filtered off. The dispersion obtained achieved a solids content of 1.5% by subsequent concentration.

160 g of this dispersion, 28 g of water, 6 g of a sulphopolyester (Eastek 1100, solids content 30%, average molecular weight 10000-15000, Eastman), 8 g of dimethylsulphoxide, 1 g of 3-glycidoxypropyltrimethoxysilane (Silquest A-187, OSi Specialties) and 0.4 g of wetting agent (Dynol 604, Air Products) were mixed intensively for one hour in a glass beaker with a stirrer.

Synthesis Example 7

Preparation of a Crosslinking Agent Solution 4.0 g of p-toluenesulphonic acid monohydrate, 1.7 g of 1,10-diaminodecane and 95.5 g of water were mixed intensively in a glass beaker with a stirrer.

Synthesis Example 8

Production of an Electrode Body for a Tantalum Electrolytic Capacitor

Tantalum powder having a specific capacitance of 18000 CV/g was pressed to pellets with inclusion of a tantalum wire and sintered in order to form a porous anode body having dimensions of 1.5 mm×2.9 mm×4.0 mm. 5 of these porous anode bodies were anodized in a phosphoric acid electrolyte at 100 V to form a dielectric, in order to obtain the capacitor bodies.

Synthesis Example 9

The composition from Synthesis Example 5 was diluted to a concentration of 2.0% by addition of deionized water.

Synthesis Example 10

The composition from Synthesis Example 3 was diluted to a concentration of 2.0% by addition of deionized water.

Comparative Example 2

The capacitor bodies from Synthesis Example 8 were impregnated in the composition from Synthesis Example 9 for 1 min. Thereafter, drying was carried out at 120° C. for 10 min. The impregnation and drying were carried out nine further times.

The capacitor bodies were then impregnated in the solution from Synthesis Example 7. Thereafter, drying was carried out at 120° C. for 10 min. The capacitor body was then impregnated in the dispersion from Synthesis Example 6. Thereafter, drying was carried out at 120° C. for 10 min.

The capacitor bodies were then impregnated in the solution from Synthesis Example 7. Thereafter, drying was carried out at 120° C. for 10 min. The capacitor body was then impregnated in the dispersion from Synthesis Example 6. Thereafter, drying was carried out at 120° C. for 10 min.

The capacitor bodies were then impregnated in the solution from Synthesis Example 7. Thereafter, drying was carried out at 120° C. for 10 min. The capacitor body was then impregnated in the dispersion from Synthesis Example 6. Thereafter, drying was carried out at 120° C. for 10 min.

The capacitor bodies were then covered with a graphite layer and thereafter with a silver layer in order to obtain the finished capacitors in this way.

The mean values for the electrical parameters (CAP, ESR) have been determined.

Example 2

The treatment of the capacitor bodies was carried out as described in Comparative Example 2, but the composition from Synthesis Example 10 was used instead of the composition from Synthesis Example 9.

The mean values for the electrical parameters (CAP, ESR) have been determined and the results—normalized to the Comparative Example 2—are shown in table 2.

TABLE 2

|  | CAP | ESR |
| --- | --- | --- |
| Comparative Example 2 | 1.00 | 1.00 |
| Example 2 | 1.15 | 0.25 |

Synthesis Example 11

Not According to the Present Invention 0.496 g of EDOT-S (1.5 mmol) were dissolved in 18 ml of dist. water under argon. 0.97 g (6.0 mmol) of $FeCl_3$ was then added in one portion. Thereafter, the solution was stirred at room temperature for 8 h, and heated at 100° C. for 3 h, cooled and worked up. For working up, the solution was diluted to 1 wt.-% with dist. water, 9 g of Lewatit® S100 and 9 g of Lewatit® MP 62 were added and the mixture was stirred at room temperature for 4 h. After the ion exchangers had been filtered off, a dark blue polymer solution having a solids content of 1 wt.-% was obtained. In the thus obtained composition the solid content was adjusted to 2.15 wt.-% by means of evaporation.

Synthesis Example 12

According to the Present Invention

A 3 L jacketed tank made of stainless steel is equipped a mechanical stirrer, a ventilation valve at the upper lid, a material inlet that can be closed and a thermometer.

Component A

Into this tank 2000 g of deionized water, 8.0 g of a 10 wt.-% aqueous iron(III) sulfate solution, 2.9 g sulfuric acid (95 wt.-%) and 50 g of EDOT-S sodium salt (0.15 mol) were introduced. The stirrer was operated at 50 rpm, the temperature was adjusted to 20° C. and the inner pressure was reduced to 100 hPa. The pressure in the tank was subsequently raised to atmospheric pressure, followed by a further reduction of a pressure to 25 hPa in order to expel the oxygen.

Component B

In a separate glass beaker 39.3 g sodium peroxodisulfate were dissolved in 200 ml water and nitrogen was blown through the solution for 30 minutes while stirring until the oxygen content was below 0.25 mg/l.

Component B was then sucked into the tank. The material inlet was then closed and the inner pressure of the tank was adjusted to 25 hPa by means of a vacuum pump. The initial pH of the reaction solution was 1.9 and the reaction was continued for 19 hours under this reduced pressure. After the reaction was completed, 600 g Lewatit Monoplus S 108H and 500 g Lewatit MP62 (Lanxess AG, Cologne) were added and stirred with a mechanical stirrer. After 6 hours the Lewatit was removed by filtration.

The sample was concentrated by means of rotary evaporator until a solid content of >2 wt.-% was reached. The thus obtained composition was characterized by a solid content of 2.14 wt.-%.

Synthesis Example 13

According to the Present Invention

A 3 L jacketed tank made of stainless steel is equipped a mechanical stirrer, a ventilation valve at the upper lid, a material inlet that can be closed and a thermometer.

Component A

Into this tank 2000 g of deionized water, 16.0 g of a 10 wt.-% aqueous iron(III) sulfate solution, 5.7 g sulfuric acid (95 wt.-%) and 100 g of EDOT-S sodium salt (0.29 mol) were introduced. The stirrer was operated at 50 rpm, the temperature was adjusted to 20° C. and the inner pressure was reduced to 100 hPa. The pressure in the tank was subsequently raised to atmospheric pressure, followed by a further reduction of a pressure to 25 hPa in order to expel the oxygen.

Component B

In a separate glass beaker 78.5 g sodium peroxodisulfate were dissolved in 200 ml water and nitrogen was blown through the solution for 30 minutes while stirring until the oxygen content was below 0.25 mg/l.

Component B was then sucked into the tank. The material inlet was then closed and the inner pressure of the tank was adjusted to 25 hPa by means of a vacuum pump. The initial pH of the reaction solution was 1.9 and the reaction was continued for 19 hours under this reduced pressure. After the reaction was completed, 1100 g Lewatit Monoplus S 108H and 1000 g Lewatit MP62 (Lanxess AG, Cologne) were added and stirred with a mechanical stirrer. After 6 hours the Lewatit was removed by filtration.

The thus obtained composition was characterized by a solid content of 1.19 wt.-%. The composition was further concentrated by means of rotary evaporator until a solid content of >2 wt.-% was reached. The thus obtained composition was characterized by a solid content of 2.15% and a conductivity of 41 S/cm.

The mass average molecular weight $M_w$ and the molar average molecular weight $M_n$ of the compositions obtained in Synthesis Example 11, Synthesis Example 12 and Synthesis Example 13 are shown in the following table 3:

TABLE 3

| | $M_w$ | $M_n$ | $M_w/M_n$ |
|---|---|---|---|
| Synthesis Example 11 | 23300 g/mol | 5300 g/mol | 4 |
| Synthesis Example 12 | 79000 g/mol | 8400 g/mol | 9 |
| Synthesis Example 13 | 204000 g/mol | 9500 g/mol | 21 |

Comparative Example 3

An aluminium capacitor was prepared as in Comparative Example 1 with the sole difference that instead of the composition from Synthesis Example 5 the composition from Synthesis Example 11 has been used.

Example 3

An aluminium capacitor was prepared as in Example 1 with the sole difference that instead of the composition from Synthesis Example 3 the composition from Synthesis Example 12 has been used.

Example 4

An aluminium capacitor was prepared as in Example 1 with the sole difference that instead of the composition from Synthesis Example 3 the composition from Synthesis Example 13 has been used.

The mean values for the electrical parameters (CAP, ESR) are shown in table 4, wherein the values were normalized to the Comparative Example 3. Also shown are the ESR-values of the capacitors after they have been stored for 500 hours at 85° C. and 85% relative humidity (the values are normalized to the corresponding values before storage under these conditions).

TABLE 4

| | CAP | ESR | ESR after 500 h at 85° C./85% rh |
|---|---|---|---|
| Comparative Example 3 | 1.0 | 1.0 | 137.1 |
| Example 3 | 1.0 | 0.9 | 23.8 |
| Example 4 | 1.0 | 0.8 | 9.5 |

These results clearly show that when using a PEDOT-S-composition having a high $M_w/M_n$-value of larger than 6 for the preparation of a solid electrolyte layer in a capacitor, not only the ESR-value can be improved (as can be seen in the third column of table 4), but also the stability when the capacitor is stored at high temperatures and a high relative humidity. As can be seen in column 4 of table 4, the ESR-value increases to a lower extent in a capacitor the solid electrolyte layer of which has been prepared with a PEDOT-S-composition according to the present invention (i. e. with a PEDOT-S-composition having a $M_w/M_n$-value >6), compared to a capacitor the solid electrolyte layer of which has been prepared with a PEDOT-S-composition according to the prior art.

Synthesis Example 14

Production of an Electrode Body for a Tantalum Electrolytic Capacitor

Tantalum powder having a specific capacitance of 30000 CV/g was pressed to pellets with inclusion of a tantalum wire and sintered in order to form a porous anode body having dimensions of 1.4 mm×2.8 mm×3.9 mm. 5 of these porous anode bodies were anodized in a phosphoric acid electrolyte at 60 V to form a dielectric, in order to obtain the capacitor bodies.

Comparative Example 4

A tantalum electrolytic capacitor was prepared as in Comparative Example 2 with the differences that instead of the capacitor bodies from Synthesis Example 8 the capacitor bodies from Synthesis Example 14 has been used and that instead of the composition from Synthesis Example 9 the composition from Synthesis Example 11 has been used.

Example 5

A tantalum electrolytic capacitor was prepared as in Example 2 with the differences that instead of the capacitor bodies from Synthesis Example 8 the capacitor bodies from Synthesis Example 14 has been used and that instead of the composition from Synthesis Example 10 the composition from Synthesis Example 12 has been used.

Example 6

A tantalum electrolytic capacitor was prepared as in Example 2 with the differences that instead of the capacitor bodies from Synthesis Example 8 the capacitor bodies from Synthesis Example 14 has been used and that instead of the composition from Synthesis Example 10 the composition from Synthesis Example 13 has been used.

The mean values for the electrical parameters (CAP, ESR) are shown in table 5, wherein the values were normalized to the Comparative Example 4.

TABLE 5

|  | CAP | ESR |
| --- | --- | --- |
| Comparative Example 4 | 1.00 | 1.00 |
| Example 5 | 1.00 | 0.57 |
| Example 6 | 1.17 | 0.26 |

These results clearly show that when using a PEDOT-S-composition having a high $M_w/M_n$-value of larger than 6 for the preparation of a solid electrolyte layer in a capacitor, both the capacitance and the ESR-value can be improved.

Synthesis Example 15

Not According to the Present Invention

A 3 L jacketed tank made of stainless steel is equipped a mechanical stirrer, a ventilation valve at the upper lid, a material inlet that can be closed and a thermometer.

Component A

Into this tank 2000 g of deionized water, 16.0 g of a 10 wt.-% aqueous iron(III) sulfate solution, 5.7 g sulfuric acid (95 wt.-%) and 100 g of EDOT-S sodium salt (0.29 mol) which contains 20 wt.-% PRODOT-S sodium salt (determined by HPLC) were introduced. The stirrer was operated at 50 rpm, the temperature was adjusted to 20° C. and the inner pressure was reduced to 100 hPa. The pressure in the tank was subsequently raised to atmospheric pressure, followed by a further reduction of a pressure to 25 hPa in order to expel the oxygen.

Component B

In a separate glass beaker 78.5 g sodium peroxodisulfate were dissolved in 200 ml water and nitrogen was blown through the solution for 30 minutes while stirring until the oxygen content was below 0.25 mg/l.

Component B was then sucked into the tank. The material inlet was then closed and the inner pressure of the tank was adjusted to 25 hPa by means of a vacuum pump. The initial pH of the reaction solution was 1.9 and the reaction was continued for 19 hours under this reduced pressure. After the reaction was completed, the reaction mixture was filled up to a volume of 10 L by adding deionized water and was subsequently treated by means of ultrafiltration (Pall Microza SLP 1053 with a cut off of 10000 g/mol), whereby 8 L of water were removed. This procedure was repeated 6 times in order to remove the inorganic salts.

The resulting dispersion had a solid content of 1.47 wt.-% and was further concentrated by means of rotary evaporator to a solid content of 2.96 wt.-%.

Synthesis Example 16

According to the Present Invention

A PEDOT-S-composition has been prepared in the same way as in Synthesis Example 15, with the sole difference that an EDOT-S sodium salt which contains 10 wt.-% PRODOT-S sodium salt has been used.

Comparative Example 5

A tantalum electrolytic capacitor was prepared as in Comparative Example 4 with the sole difference that instead of the composition from Synthesis Example 11 the composition from Synthesis Example 15 has been used.

Example 7

A tantalum electrolytic capacitor was prepared as in Example 5 with the sole difference that instead of the composition from Synthesis Example 10 the composition from Synthesis Example 16 has been used.

The mean values for the electrical parameters (CAP, ESR) are shown in table 6, wherein the values were normalized to the Comparative Example 5.

TABLE 6

|  | CAP | ESR |
| --- | --- | --- |
| Comparative Example 5 | 1.00 | 1.00 |
| Example 7 | 1.00 | 0.77 |

These results clearly show that when using a PEDOT-S-composition having a PRODOT-S-content of only 10 wt.-% for the preparation of a solid electrolyte layer in a tantalum electrolytic capacitor, the ESR-value is significantly lower compared to a tantalum electrolytic capacitor the solid electrolyte of which has been prepared by means of a PEDOT-S-composition that is based on an EDOT-S-monomer having a PRODOT-S-content of 20 wt.-%.

The invention claimed is:
1. A process for producing a liquid composition comprising functionalized π-conjugated polythiophenes, the process comprising:

i) providing a liquid phase comprising
a) thiophene monomers of formula (I)

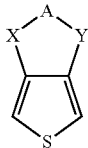

wherein
X and Y are identical or different and are independently selected from O, S, and NR$^1$, wherein R$^1$ is hydrogen or an aliphatic or aromatic residue having 1 to 18 carbon atoms; and
A is an organic residue carrying an anionic functional group;
b) an oxidizing agent; and
c) a solvent;
ii) oxidatively polymerizing the thiophene monomers of formula (I) to obtain the liquid composition;
wherein
(α1) the pH of the liquid phase provided in process step i) is adjusted to a value below 7.0, wherein the pH is determined at a temperature of 20° C.; and
(α2) the chloride content of the liquid phase provided in process step i) is less than 10000 ppm, based on the total weight of the liquid phase.

2. The process according to claim 1, wherein
(α3) the oxygen content of the liquid phase provided in process step i) is less than 1000 ppm, based on the total weight of the liquid phase.

3. The process according to claim 1, wherein
X and Y are O, and
A is —(CH$_2$)$_m$—CR$^2$R$^3$—(CH$_2$)$_n$—,
wherein
R$^2$ is hydrogen or —(CH$_2$)$_s$—Z—(CH$_2$)$_p$—SO$_3^-$M$^+$,
R$^3$ is —(CH$_2$)$_s$—Z—(CH$_2$)$_p$—SO$_3^-$M$^+$,
Z is O, S or —CH$_2$—,
M$^+$ is a cation,
m and n are identical or different and are independently an integer from 0 to 3,
s is an integer from 0 to 10 and
p is an integer from 1 to 18.

4. The process according to claim 1, wherein
X and Y are O, and
A is —(CH$_2$)—CR$^2$R$^3$—(CH$_2$)$_n$—,
wherein
R$^2$ is hydrogen,
R$^3$ is —(CH$_2$)$_s$—O—(CH$_2$)$_p$—SO$_3^-$M$^+$,
M$^+$ is Na$^+$ or K$^+$,
n is 0 or 1,
s is 0 or 1, and
p is 4 or 5.

5. The process according to claim 1, wherein
X and Y are O, and
A is —(CH$_2$—CHR)—,
wherein
R is —(CH$_2$)$_t$—O—Ar—[(W)$_u$—SO$_3^-$M$^+$]$_v$,
wherein
Ar is an optionally substituted C$_6$-C$_{20}$ arylene group;
W is an optionally substituted C$_1$-C$_6$ alkylene group;
M$^+$ is H$^+$, an alkali cation selected from the group consisting of Li$^+$, Na$^+$, and K$^+$, NH(R$^1$)$_3$ or HNC$_5$H$_5$, wherein each R$^1$ group is, independently, a hydrogen atom or an optionally substituted C$_1$-C$_6$ alkyl group;
t is an integer of 0 to 6;
u is an integer of 0 or 1; and
v is an integer of 1 to 4.

6. The process according to claim 1, wherein the oxidizing agent b) is a salt of a heavy metal, a salt of a peroxodisulfate, or a mixture thereof.

7. The process according to claim 1, wherein the thiophene monomers are polymerized in process step ii) by electrochemical polymerization and wherein the oxidizing agent b) is an electrode.

8. The process according to claim 1, wherein the solvent c) is water.

9. The process according to claim 1, wherein the pH of the fluid phase provided in process step i) is adjusted to a value below 7.0 using an organic acid or an inorganic acid.

10. The process according to claim 1, wherein the oxidative polymerization in process step ii) is performed under an inert gas atmosphere of nitrogen, argon, carbon dioxide or a mixture thereof.

11. The process according to claim 10, wherein the oxidative polymerization in process step ii) is performed under a pressure that is equal to or above the vapor pressure of the liquid phase during the polymerization reaction in process step ii).

12. The process according to claim 1, wherein the oxidative polymerization in process step ii) is performed under a reduced pressure of not more than 0.8 bar.

13. A liquid composition obtained by the process according to claim 1.

14. A liquid composition comprising a functionalized π-conjugated polythiophene, wherein the polythiophene comprises repeating units of formula (I)

wherein
X and Y are both O;
A is an organic residue carrying an anionic functional group; and
wherein the ratio of the mass average molecular weight M$_w$ to the molar average molecular weight M$_n$ (M$_w$/M$_n$) of the functionalized π-conjugated polythiophene is at least 6.

15. The liquid composition according to claim 14, wherein the mass average molecular weight M$_w$ of the functionalized π-conjugated polythiophene is at least 50000 g/mol.

16. The liquid composition according to claim 15, wherein the mass average molecular weight M$_w$ of the functionalized π-conjugated polythiophene is in the range from 125000 g/mol to 240000 g/mol.

17. The liquid composition according to claim 14, wherein the molar average molecular weight M$_n$ of the functionalized π-conjugated polythiophene is less than 25000 g/mol.

18. The liquid composition according to claim 14, wherein the functionalized π-conjugated polythiophene is present in the liquid composition in the form of particles, the particles being characterized by i) a $d_{50}$-value (weight average particle diameter) in the range from 1 to 100 nm, and
ii) a $d_{90}$-value of less than $3.5 \times d_{50}$.

19. A process for producing a liquid composition comprising functionalized π-conjugated polythiophenes, the process comprising:
   i) providing a liquid phase comprising
      a) thiophene monomers of the general formula (I)

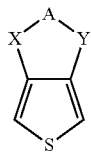
(I)

wherein X, Y and A are as defined in claim 1, and
wherein the liquid phase comprises a mixture of thiophene monomers of formula (Ia) and thiophene monomers of formula (Ib)

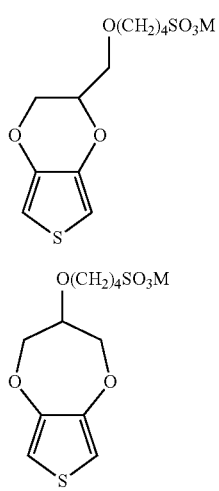

and wherein the content of thiophene monomers of formula (Ib) is less than 18 wt.-%, and the content of thiophene monomers of formula (Ia) is more than 82 wt.-%, in each case based on the total weight of the thiophene monomers in the liquid phase, wherein the content of thiophene monomers of formula (Ia) and the content of thiophene monomers of formula (Ib) equal 100 wt.-%;
   b) an oxidizing agent; and
   c) a solvent; and
   ii) oxidatively polymerizing the thiophene monomers of formula (Ia) and (Ib) to obtain the liquid composition.

20. The process according to claim 19, wherein the content of thiophene monomers of formula (Ib) is at least 0.2 wt.-%, based on the total weight of the thiophene monomers in the liquid phase.

21. A liquid composition obtained by the process according to claim 19.

22. A liquid composition comprising a functionalized π-conjugated polythiophene, wherein the polythiophene comprises repeating units of formula (I)

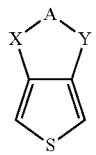
(I)

wherein
   X and Y are identical or different and are independently selected from O, S, and $NR^1$, wherein $R^1$ is hydrogen or an aliphatic or aromatic residue having 1 to 18 carbon atoms; and
   A is an organic residue carrying an anionic functional group; and
wherein the functionalized π-conjugated polythiophene comprises repeating units of formula (Ia) and repeating units of formula (Ib)

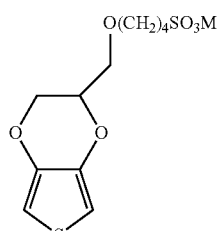

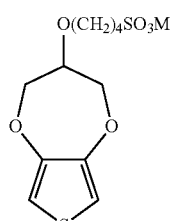

and wherein the content of repeating units of formula (Ib) is less than 18 wt.-%, and the content of repeating units of formula (Ia) is more than 82 wt.-%, in each case based on the total weight of the functionalized π-conjugated polythiophene, wherein the content of repeating units of formula (Ia) and the content of repeating units of formula (Ib) equal 100 wt.-%.

23. The liquid composition according to claim 22, wherein the content of repeating units of formula (Ib) is at least 0.2 wt.-%, based on the total weight of the functionalized π-conjugated polythiophene.

24. The liquid composition according to claim 14, wherein a conductive layer made by the liquid composition has a conductivity of more than 12 S/cm.

25. A process for the production of a capacitor, comprising
   I) providing an electrode body of an electrode material, wherein a dielectric covers one surface of this electrode material at least partly under formation of an anode body; and
   II) introducing a liquid composition according to claim 13 into at least a part of the electrode body.

26. A capacitor obtained by the process according to claim 25.

27. An electronic device comprising a conductive layer, wherein the conductive layer comprises a liquid composition according to claim 13.

28. The electronic device according to claim 27, wherein the electronic device is selected from photoconductive cells, photoresistors, photoswitches, phototransistors, phototubes, IR detectors, photovoltaic device, solar cells, coating materials for memory storage devices, field effect resistance devices, anti-static films, biosensors, electrochromic devices, solid electrolyte capacitors, energy storage devices, touch panels and electromagnetic shielding.

29. The electronic device according to claim 28, wherein the conductive layer is a solid electrolyte layer in a solid electrolyte capacitor.

30. The liquid composition according to claim 14, wherein
X and Y are O; and
A is $-(CH_2)_m-CR^2R^3-(CH_2)_n-$;
wherein
$R^2$ is hydrogen or $-(CH_2)_s-Z-(CH_2)_p-SO_3^-M^+$,
$R^3$ is $-(CH_2)_s-Z-(CH_2)_p-SO_3^-M^+$,
Z is O, S or $-CH_2-$,
$M^+$ is a cation,
m and n are identical or different and are independently an integer from 0 to 3,
s is an integer from 0 to 10 and
p is an integer from 1 to 18.

31. The liquid composition according to claim 14, wherein
X and Y are O; and
A is $-(CH_2)-CR^2R^3-(CH_2)_n-$;
wherein
$R^2$ is hydrogen,
$R^3$ is $-(CH_2)_s-O-(CH_2)_p-SO_3^-M^+$,
$M^+$ is $Na^+$ or $K^+$,
n is 0 or 1,
s is 0 or 1, and
p is 4 or 5.

32. The liquid composition according to claim 14, wherein
X and Y are O; and
A is $-(CH_2-CHR)-$;
wherein
R is $-(CH_2)_t-O-Ar-[(W)_u-SO_3^-M^+]_v$,
wherein
Ar is an optionally substituted $C_6$-$C_{20}$ arylene group;
W is an optionally substituted $C_1$-$C_6$ alkylene group;
$M^+$ is $H^+$, an alkali cation selected from the group consisting of $Li^+$, $Na^+$, and $K^+$, $NH(R^1)_3$ or $HNC_5H_5$, wherein each $R^1$ group is, independently, a hydrogen atom or an optionally substituted $C_1$-$C_6$ alkyl group;
t is an integer of 0 to 6;
u is an integer of 0 or 1; and
v is an integer of 1 to 4.

33. The liquid composition according to claim 22, wherein
X and Y are O; and
A is $-(CH_2)_m-CR^2R^3-(CH_2)_n-$;
wherein
$R^2$ is hydrogen or $-(CH_2)_s-Z-(CH_2)_p-SO_3^-M^+$,
$R^3$ is $-(CH_2)_s-Z-(CH_2)_p-SO_3^-M^+$,
Z is O, S or $-CH_2-$,
$M^+$ is a cation,
m and n are identical or different and are independently an integer from 0 to 3,
s is an integer from 0 to 10 and
p is an integer from 1 to 18.

34. The liquid composition according to claim 22, wherein
X and Y are O; and
A is $-(CH_2)-CR^2R^3-(CH_2)_n-$;
wherein
$R^2$ is hydrogen,
$R^3$ is $-(CH_2)_s-O-(CH_2)_p-SO_3^-M^+$,
$M^+$ is $Na^+$ or $K^+$,
n is 0 or 1,
s is 0 or 1, and
p is 4 or 5.

35. The liquid composition according to claim 22, wherein
X and Y are O; and
A is $-(CH_2-CHR)-$;
wherein
R is $-(CH_2)_t-O-Ar-[(W)_u-SO_3^-M^+]_v$,
wherein
Ar is an optionally substituted $C_6$-$C_{20}$ arylene group;
W is an optionally substituted $C_1$-$C_6$ alkylene group;
$M^+$ is $H^+$, an alkali cation selected from the group consisting of $Li^+$, $Na^+$, and $K^+$, $NH(R^1)_3$ or $HNC_5H_5$, wherein each $R^1$ group is, independently, a hydrogen atom or an optionally substituted $C_1$-$C_6$ alkyl group;
t is an integer of 0 to 6;
u is an integer of 0 or 1; and
v is an integer of 1 to 4.

36. The liquid composition of claim 14, wherein the liquid composition is present in a solid electrolyte layer in a solid electrolyte capacitor.

37. A liquid composition comprising a functionalized π-conjugated polythiophene, wherein the polythiophene consists of repeating units of formula (I)

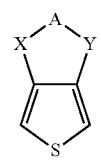

wherein
X and Y are both O;
A is an organic residue carrying an anionic functional group;
wherein the ratio of the mass average molecular weight $M_w$ to the molar average molecular weight $M_n$ ($M_w/M_n$) of the functionalized π-conjugated polythiophene is at least 6.

38. The liquid composition of claim 36, wherein the liquid composition is present in a solid electrolyte layer in a solid electrolyte capacitor.

* * * * *